United States Patent
Kondo et al.

(10) Patent No.: US 6,650,256 B2
(45) Date of Patent: Nov. 18, 2003

(54) DATA PROCESSING APPARATUS, DATA PROCESSING METHOD, PROGRAM, PROGRAM RECORDING MEDIUM, EMBEDDED DATA, AND DATA RECORDING MEDIUM

(75) Inventors: Tetsujiro Kondo, Tokyo (JP); Naoki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/103,082

(22) Filed: Mar. 21, 2002

(65) Prior Publication Data

US 2002/0167424 A1 Nov. 14, 2002

(30) Foreign Application Priority Data

Mar. 22, 2001 (JP) ........................................ 2001-082022

(51) Int. Cl.$^7$ ................................................ H03M 7/00
(52) U.S. Cl. .................... 341/50; 380/240; 380/241; 705/24
(58) Field of Search ................................ 380/240–242; 341/50

(56) References Cited

U.S. PATENT DOCUMENTS

| 6,216,112 B1 | * | 4/2001 | Fuller et al. ................... 705/14 |
| 2002/0059144 A1 | * | 5/2002 | Meffert et al. ................ 380/30 |
| 2002/0146123 A1 | * | 10/2002 | Tian ........................... 380/234 |

* cited by examiner

*Primary Examiner*—Howard L. Williams
(74) *Attorney, Agent, or Firm*—Frommer Lawrence & Haug LLP; William S. Frommer; Bruno Polito

(57) ABSTRACT

A data processing apparatus for coding data includes a coder for generating third data by coding first data and second data. A decoding-information generator generates decoding information, the third data being decoded into the first data and the second data based on the decoding information. An embedding coder embeds the decoding information generated by the decoding-information generator into the third data, thereby generating embedded data.

29 Claims, 36 Drawing Sheets

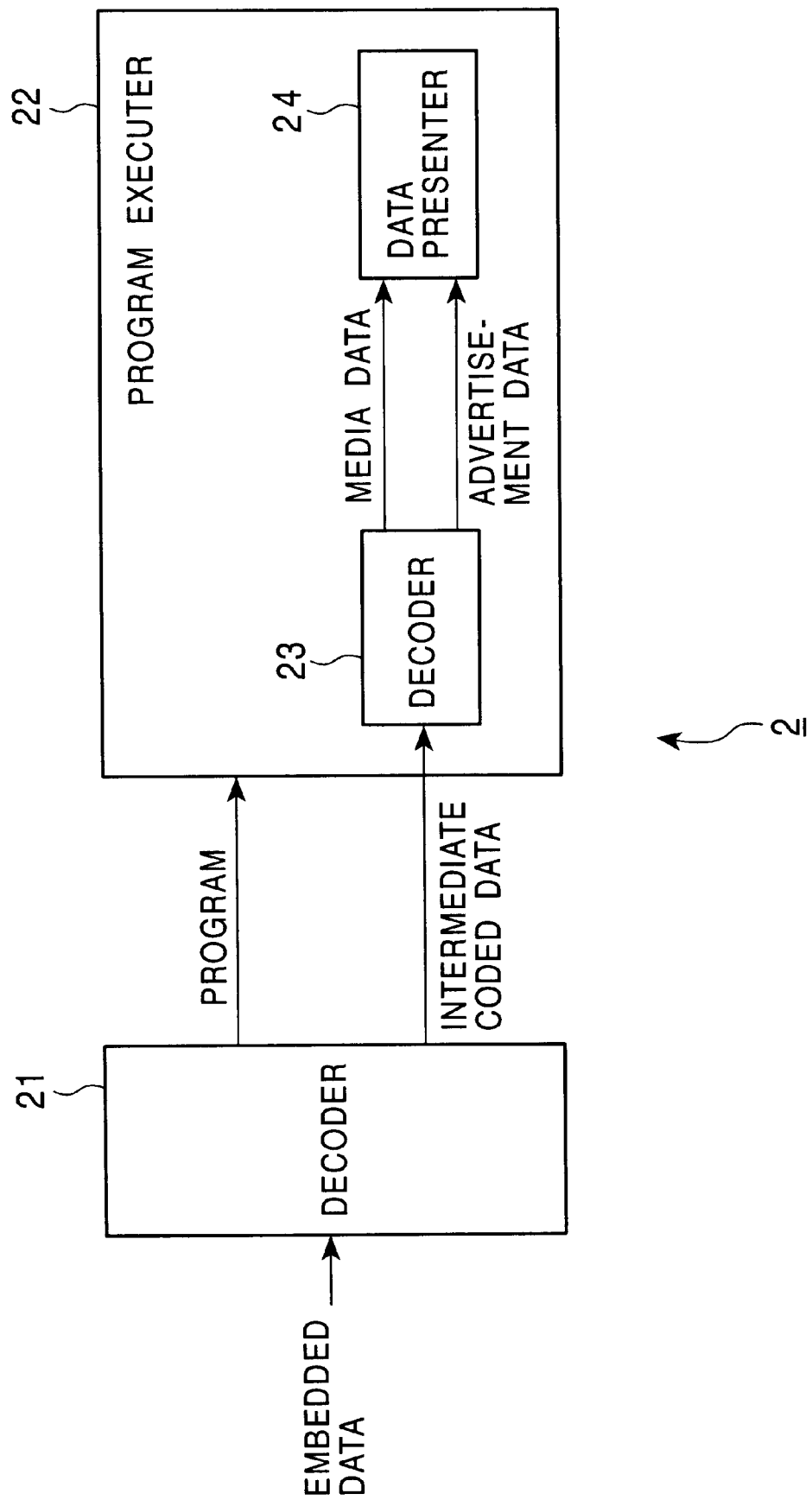

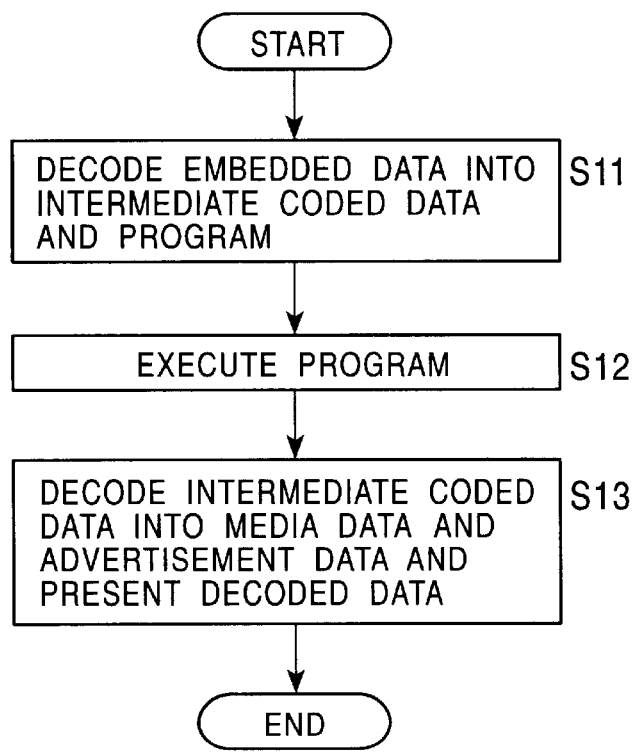
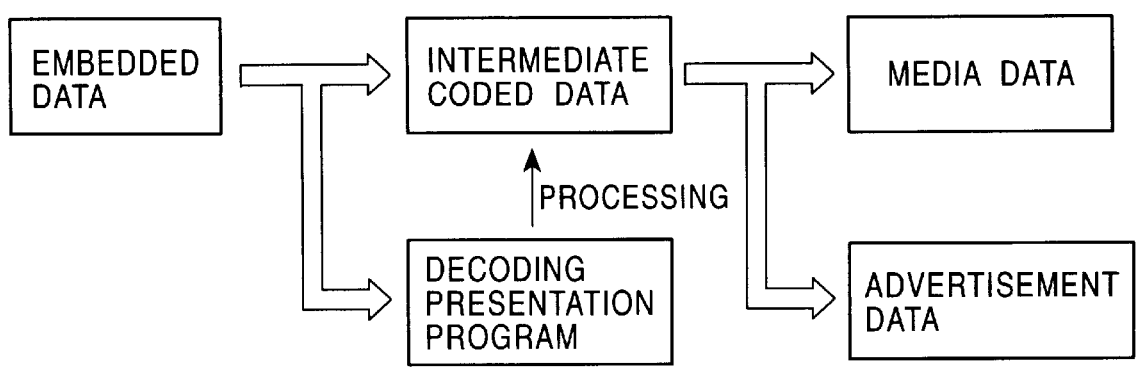

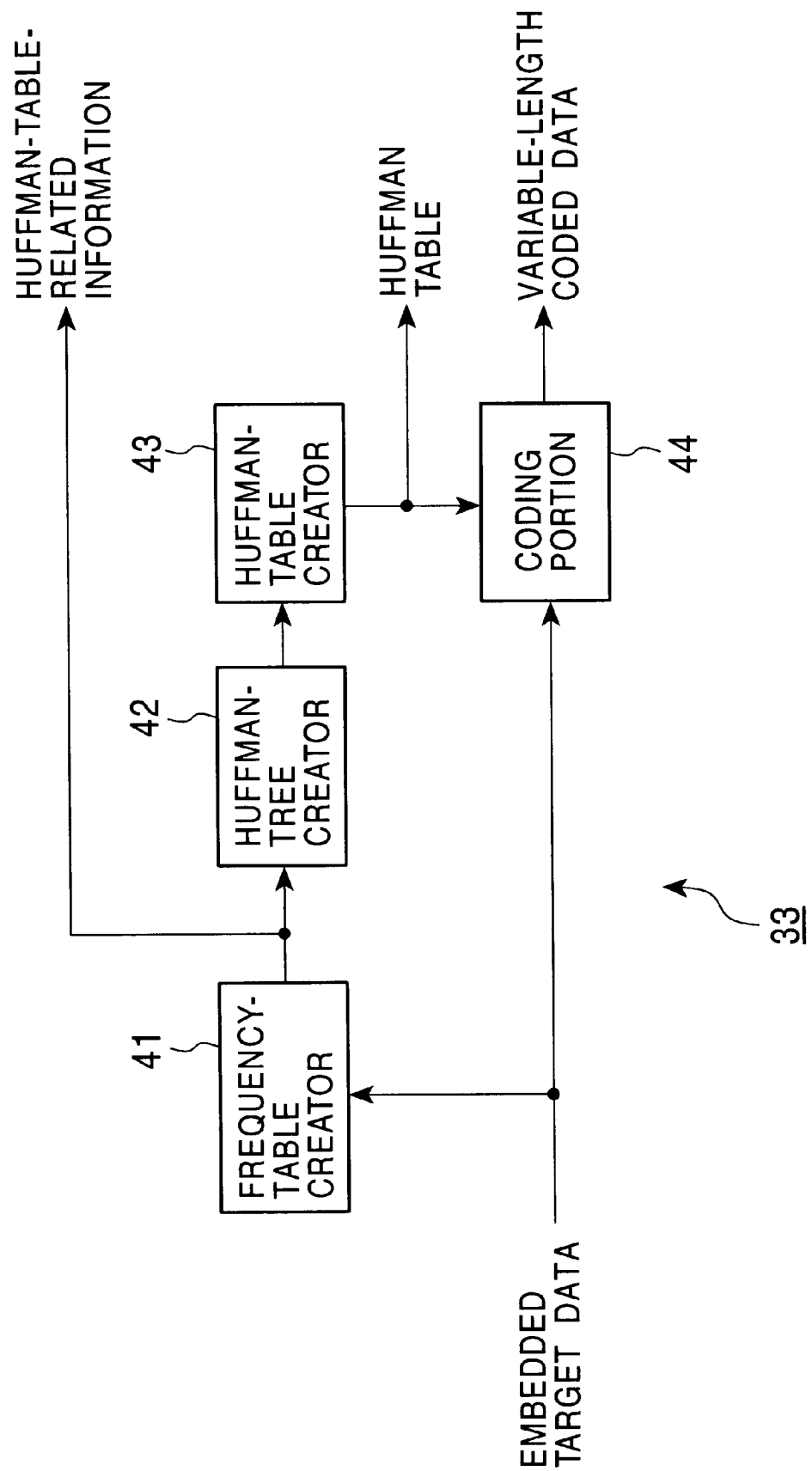

FIG. 10A

| VALUE | FREQUENCY |
|---|---|
| 0 | 5 |
| 1 | 4 |
| 2 | 3 |
| 3 | 2 |
| 4 | 1 |

| VALUE | VARIABLE-LENGTH CODED DATA |
|---|---|
| 0 | 11 |
| 1 | 10 |
| 2 | 01 |
| 3 | 001 |
| 4 | 000 |

FIG. 12

| VALUE | FREQUENCY | VARIABLE-LENGTH CODED DATA |
|---|---|---|
| 7 | 18120 | 1100111 |
| 8 | 12951 | 0100011 |
| 9 | 10129 | 11010011 |
| 10 | 8117 | 11001000 |
| 11 | 6793 | 01110010 |
| 12 | 5941 | 110111111 |
| 13 | 5239 | 110111010 |
| 14 | 4726 | 110100001 |
| 15 | 4235 | 110011001 |
| 16 | 4209 | 110011000 |
| 17 | 3891 | 011101011 |
| 18 | 3230 | 010001010 |
| 19 | 2950 | 1101111101 |
| 20 | 2680 | 1101111000 |
| 21 | 2473 | 1101000111 |
| 22 | 2356 | 1101000100 |
| 23 | 2110 | 1100100111 |
| 24 | 2095 | 1100100110 |
| 25 | 1860 | 0111010010 |
| 26 | 1733 | 0111001100 |
| 27 | 1619 | 0100010011 |
| 28 | 1570 | 0100010001 |
| 29 | 1383 | 11011110111 |
| 30 | 1370 | 11011110101 |
| 31 | 1269 | 11011100010 |
| 32 | 1162 | 11001101110 |
| 33 | 1153 | 11001101101 |
| 34 | 1021 | 11001001001 |
| 35 | 1020 | 11001001000 |
| 36 | 929 | 01110100011 |
| 37 | 872 | 01110011100 |
| 38 | 818 | 01110000100 |
| 39 | 750 | 01000001010 |

FIG. 14

| VALUE | FRE-QUENCY | VARIABLE-LENGTH CODED DATA | EMBEDDED CODED DATA | EMBEDDED DECODED VALUE |
|---|---|---|---|---|
| 7 | 18120 | 1100111 | 1100111 | 7 |
| 8 | 12951 | 0100011 | 0100011 | 8 |
| 9 | 10129 | 11010011 | 01110010 | 11 |
| 10 | 8117 | 11001000 | 11001000 | 10 |
| 11 | 6793 | 01110010 | 11010011 | 9 |
| 12 | 5941 | 110111111 | 110011001 | 15 |
| 13 | 5239 | 110111010 | 110111010 | 13 |
| 14 | 4726 | 110100001 | 110100001 | 14 |
| 15 | 4235 | 110011001 | 110111111 | 12 |
| 16 | 4209 | 110011000 | 010001010 | 18 |
| 17 | 3891 | 011101011 | 110011000 | 16 |
| 18 | 3230 | 010001010 | 011101011 | 17 |
| 19 | 2950 | 1101111101 | 1101111101 | 19 |
| 20 | 2680 | 1101111000 | 0111010010 | 25 |
| 21 | 2473 | 1101000111 | 0100010001 | 28 |
| 22 | 2356 | 1101000100 | 1101000100 | 22 |
| 23 | 2110 | 1100100111 | 1101000111 | 21 |
| 24 | 2095 | 1100100110 | 1100100110 | 24 |
| 25 | 1860 | 0111010010 | 1101111000 | 20 |
| 26 | 1733 | 0111001100 | 0111001100 | 26 |
| 27 | 1619 | 0100010011 | 0100010011 | 27 |
| 28 | 1570 | 0100010001 | 1100100111 | 23 |
| 29 | 1383 | 11011110111 | 01110000100 | 38 |
| 30 | 1370 | 11011110101 | 11011110101 | 30 |
| 31 | 1269 | 11011100010 | 11011100010 | 31 |
| 32 | 1162 | 11001101110 | 11001001001 | 34 |
| 33 | 1153 | 11001101101 | 11001101101 | 33 |
| 34 | 1021 | 11001001001 | 01000001010 | 39 |
| 35 | 1020 | 11001001000 | 11001001000 | 35 |
| 36 | 929 | 01110100011 | 01110100011 | 36 |
| 37 | 872 | 01110011100 | 01110011100 | 37 |
| 38 | 818 | 01110000100 | 11011110111 | 29 |
| 39 | 750 | 01000001010 | 11001101110 | 32 |

FIG. 36

| p(1,1) | p(2,1) | p(3,1) | p(4,1) | p(5,1) | p(6,1) | p(7,1) | p(8,1) | p(9,1) |
|---|---|---|---|---|---|---|---|---|
| p(1,2) | p(2,2) | p(3,2) | p(4,2) | p(5,2) | p(6,2) | p(7,2) | p(8,2) | p(9,2) |
| p(1,3) | p(2,3) | p(3,3) | p(4,3) | p(5,3) | p(6,3) | p(7,3) | p(8,3) | p(9,3) |
| p(1,4) | p(2,4) | p(3,4) | p(4,4) | p(5,4) | p(6,4) | p(7,4) | p(8,4) | p(9,4) |
| p(1,5) | p(2,5) | p(3,5) | p(4,5) | p(5,5) | p(6,5) | p(7,5) | p(8,5) | p(9,5) |
| p(1,6) | p(2,6) | p(3,6) | p(4,6) | p(5,6) | p(6,6) | p(7,6) | p(8,6) | p(9,6) |
| p(1,7) | p(2,7) | p(3,7) | p(4,7) | p(5,7) | p(6,7) | p(7,7) | p(8,7) | p(9,7) |
| p(1,8) | p(2,8) | p(3,8) | p(4,8) | p(5,8) | p(6,8) | p(7,8) | p(8,8) | p(9,8) |
| p(1,9) | p(2,9) | p(3,9) | p(4,9) | p(5,9) | p(6,9) | p(7,9) | p(8,9) | p(9,9) |
| p(1,10) | p(2,10) | p(3,10) | p(4,10) | p(5,10) | p(6,10) | p(7,10) | p(8,10) | p(9,10) |

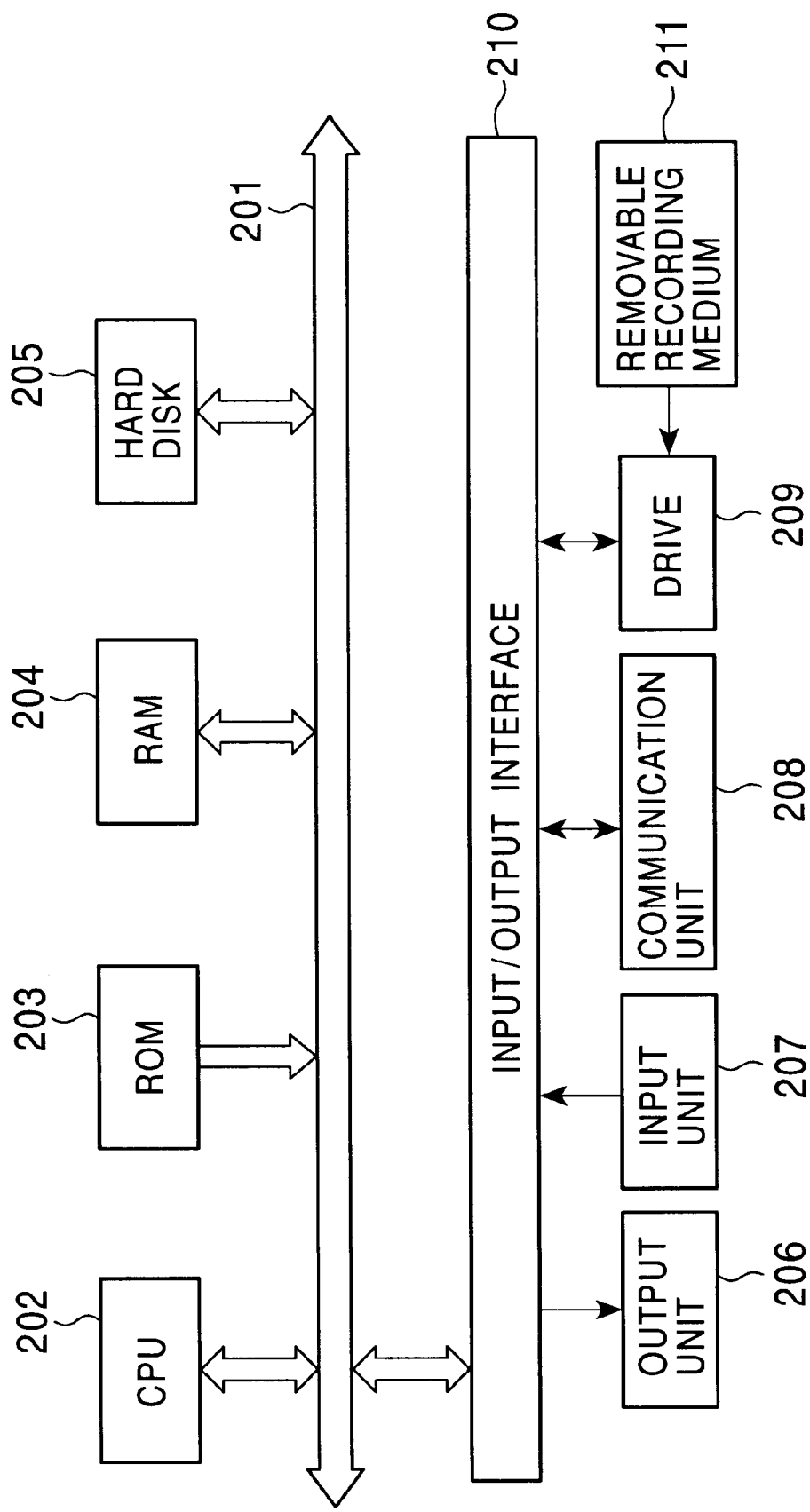

DATA PROCESSING APPARATUS, DATA PROCESSING METHOD, PROGRAM, PROGRAM RECORDING MEDIUM, EMBEDDED DATA, AND DATA RECORDING MEDIUM

BACKGROUND OF THE INVENTION

1. Field of the Invention

The present invention generally relates to a data processing apparatus, a data processing method, a program, a program recording medium, embedded data, and a data recording medium. More particularly, the invention relates to a data processing apparatus and a data processing method for performing data processing so that specific information, for example, advertisement information, can be reliably presented to users. The invention also pertains to a program implementing the above-described data processing method, a program recording medium in which such a program is recorded, embedded data used in the data processing apparatus or the data processing method, and a data recording medium in which such data is recorded.

2. Description of the Related Art

The world wide web (WWW) system has been constructed on the Internet. By using a WWW client, for example, a WWW browser, the user is able to speedily obtain various types of information in the form of web pages from a WWW server.

Attention is being paid to web pages as a means to provide advertisements as well as to provide web content, and various types of advertisement information are provided in the latest WWW servers.

In most cases, however, the user at the WWW client obtains only the required information without seeing the advertisement information. Accordingly, the advertisement-information providers cannot reliably provide advertisement information to the user by using web pages.

SUMMARY OF THE INVENTION

Accordingly, in order to solve the above-described problem, it is an object of the present invention to reliably provide specific information, such as advertisement information, to users.

In order to achieve the above-described object, the present invention provides a first data processing apparatus for coding data. The first data processing apparatus includes a coder for generating third data by coding first data and second data. A decoding-information generator generates decoding information, the third data being decoded into the first data and the second data based on the decoding information. An embedding coder embeds the decoding information generated by the decoding-information generator into the third data, thereby generating embedded data.

The present invention provides a first data processing method for coding data. The first data processing method includes the steps of: generating third data by coding first data and second data and generating decoding information, the third data being decoded into the first data and the second data based on the decoding information; and embedding the generated decoding information into the third data, thereby generating embedded data.

The present invention provides a first computer-controlling data processing program for coding data. The first computer-controlling data processing program includes the steps of: generating third data by coding first data and second data and generating decoding information, the third data being decoded into the first data and the second data based on the decoding information; and embedding the generated decoding information into the third data, thereby generating embedded data.

The present invention provides a first storage medium in which a computer-controlling data processing program for coding data is stored. The data processing program comprising the steps of: generating third data by coding first data and second data and generating decoding information, the third data being decoded into the first data and the second data based on the decoding information; and embedding the generated decoding information into the third data, thereby generating embedded data.

The present invention provides embedded data generated by a data processing method. The data processing method includes the steps of: generating third data by coding first data and second data and generating decoding information, the third data being decoded into the first data and the second data based on the decoding information; and embedding the generated decoding information into the third data, thereby generating embedded data.

The present invention provides a second storage medium in which embedded data generated by a data processing method is stored. The data processing method includes the steps of: generating third data by coding first data and second data and generating decoding information, the third data being decoded into the first data and the second data based on the decoding information; and embedding the generated decoding information into the third data, thereby generating embedded data.

The present invention provides a second data processing apparatus for processing embedded data which is obtained by generating third data by coding first data and second data and by embedding decoding information, which is used for decoding the third data into the first data and the second data, into the third data. The second data processing apparatus includes: a first decoder for decoding the embedded data into the third data and the decoding information; and a second decoder for decoding the third data into the first data and the second data according to the decoding information.

The present invention provides a second data processing method for processing embedded data which is obtained by generating third data by coding first data and second data and by embedding decoding information, which is used for decoding the third data into the first data and the second data, into the third data. The second data processing method includes the steps of: decoding the embedded data into the third data and the decoding information; and decoding the third data into the first data and the second data according to the decoding information.

The present invention provides a second computer-controlling data processing program for processing embedded data which is obtained by generating third data by coding first data and second data and by embedding decoding information, which is used for decoding the third data into the first data and the second data, into the third data. The second data processing program includes the steps of: decoding the embedded data into the third data and the decoding information; and decoding the third data into the first data and the second data according to the decoding information.

The present invention provides a third storage medium in which a computer-controlling data processing program is stored. The computer-controlling data processing program is used for processing embedded data which is obtained by generating third data by coding first data and second data and by embedding decoding information, which is used for decoding the third data into the first data and the second data, into the third data. The data processing program includes the steps of: decoding the embedded data into the third data and the decoding information; and decoding the third data into the first data and the second data according to the decoding information.

According to the first data processing apparatus, the first data processing method, and the first program of the present invention, the third data is generated by coding the first data and the second data, and the decoding information required for decoding the third data into the first data and the second data is generated. Then, the decoding information is embedded into the third data, thereby generating the embedded data.

According to the embedded data of the present invention, decoding information required for decoding the third data into the first data and the second data is embedded into the third data.

According to the second data processing apparatus, the second data processing method, and the second program, the embedded data is decoded into the third data and the decoding information, and the third data is decoded into the first data and the second data according to the decoding information.

With this configuration, by setting the first data to, for example, media data (content data), and the second data to, for example, advertisement data, it is possible to allow the user to see the advertisement information without fail.

BRIEF DESCRIPTION OF THE DRAWINGS

FIG. 4 is a block diagram illustrating the configuration of a decoding device 2 shown in FIG. 1;

FIG. 5 is a flowchart illustrating the processing performed by the decoding device 2;

FIG. 6 is a block diagram illustrating the processing performed by the decoding device 2;

FIG. 9 is a block diagram illustrating the configuration of a variable-length coder 33;

FIGS. 10A through 10F illustrate variable-length coding;

FIG. 12 illustrates an example of a Huffman table;

FIG. 14 illustrates an example of embedded data;

FIG. 36 illustrates the processing in step S21 of FIG. 35;

FIG. 40 is a block diagram illustrating an example of the configuration of a computer to which the present invention is applied.

DESCRIPTION OF THE PREFERRED EMBODIMENT

The present invention is described in detail below with reference to the accompanying drawings through illustration of a preferred embodiment.

Figure 1:
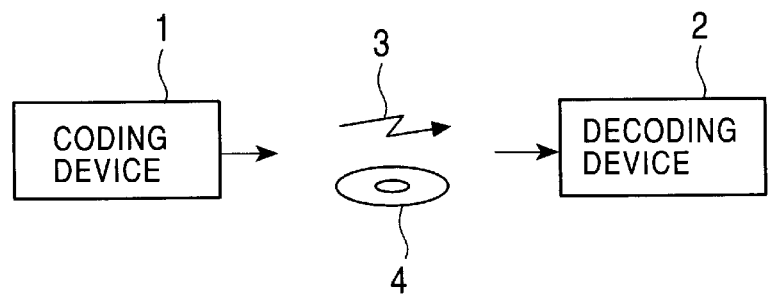
FIG. 1 is a block diagram illustrating the configuration of a data processing apparatus according to an embodiment of the present invention.

FIG. 1 is a block diagram illustrating a data processing apparatus according to an embodiment of the present invention.

The data processing apparatus shown in FIG. 1 is formed of a coding device 1 and a decoding device 2. The coding device 1 encodes data and outputs the resulting coded data.

The coded data output from the coding device 1 is transmitted via a transmission medium 3, for example, terrestrial waves, a satellite network, a cable television (CATV) network, the Internet, or a public network. Alternatively, the coded data is recorded on a recording medium 4, for example, a semiconductor memory, a magneto-optical disk, a magnetic disk, an optical disc, a magnetic tape, or a phase transition (PD) disk, and is provided to the decoding device 2.

The decoding device 2 receives the coded data transmitted via the transmission medium 3 or the recording medium 4, and decodes the received coded data.

Figure 2:
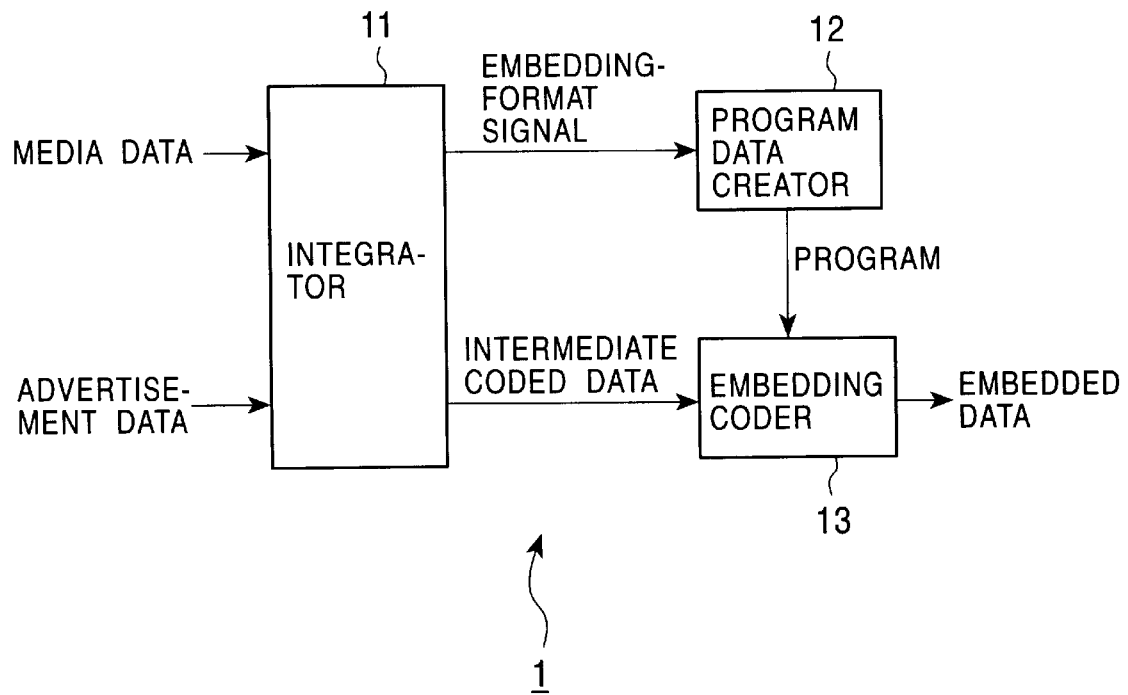
FIG. 2 is a block diagram illustrating the configuration of a coding device 1 shown in FIG. 1.

FIG. 2 is a block diagram illustrating the configuration of the coding device 1 shown in FIG. 1.

In the coding device 1 shown in FIG. 2, the data to be encoded by the coding device 1 includes two types of data, i.e., media data, such as image data, audio data (including sound data, for example, music), and text data, and advertisement data for advertising products or services.

The media data and the advertisement data are supplied to an integrator 11, and the integrator 11 integrates the media data and the advertisement data by a certain technique, and supplies the integrated data to an embedding coder 13. That is, the integrator 11 encodes the media data and the advertisement data by embedding the advertisement data into the media data so as to generate intermediate coded data. The intermediate coded data is supplied to the embedding coder 13.

The integrator 11 also generates an embedding-format signal indicating the embedding format used for embedding the advertisement data, and supplies the embedding-format signal to a program data creator 12.

The program data creator 12 decodes the intermediate coded data into the media data and the advertisement data embedded in the media data based on the embedding-format signal received from the integrator 11. The program data creator 12 also generates a program for presenting the media data and the advertisement data (hereinafter sometimes referred to as the "decoding presentation program"), and supplies it to the embedding coder 13.

The embedding coder 13 embeds the decoding presentation program output from the program data creator 12 into the intermediate coded data output from the integrator 11, and outputs the resulting embedded data as final coded data.

The processing performed by the coding device 1 shown in FIG. 2 is described below with reference to the flowchart of FIG. 3.

Upon receiving the media data and the advertisement data, in step S1, the integrator 11 embeds the advertisement data into the media data, and then supplies the resulting embedded data to the embedding coder 13 as the intermediate coded data. The integrator 11 also generates an embedding-format signal indicating the embedding format used for embedding the advertisement data into the media data in step S1, and supplies the embedding-format signal to the program data creator 12.

Then, in step S2, the program data creator 12 creates a decoding presentation program based on the embedding-format signal received from the integrator 11, and supplies the decoding presentation program to the embedding coder 13.

In step S3, the embedding coder 13 embeds the decoding presentation program received from the program data creator 12 into the intermediate coded data received from the integrator 11, thereby generating embedded data. Then, in step S4, the embedding coder 13 outputs the embedded data obtained in step S3 as the final coded data. The processing is then completed.

Figure 3:
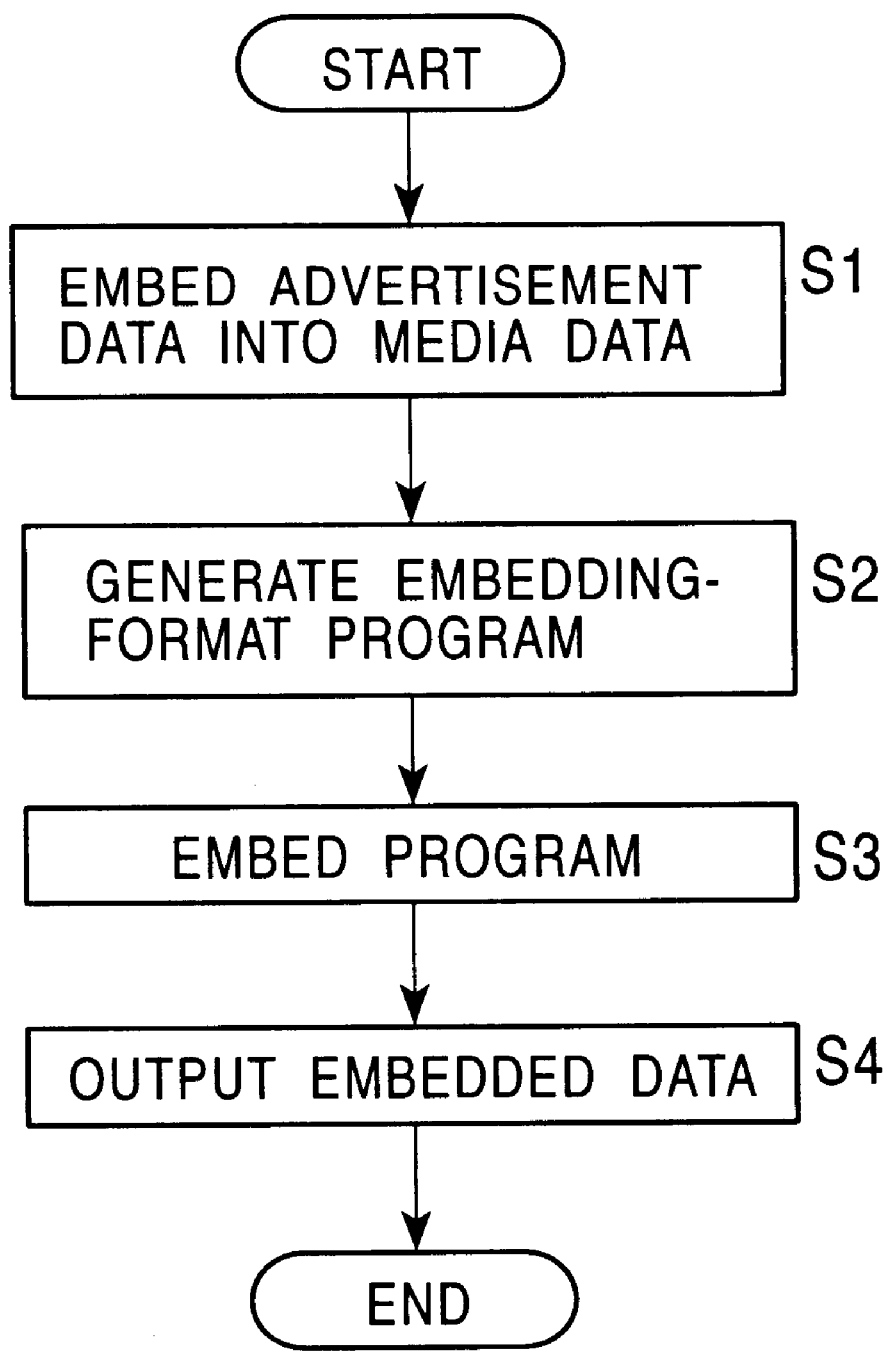
FIG. 3 is a flowchart illustrating the processing performed by the coding device 1.

The coding device 1 performs the processing indicated by the flowchart of FIG. 3 every time media data and advertisement data are supplied.

FIG. 4 is a block diagram illustrating the configuration of the decoding device 2 shown in FIG. 1.

The embedded data (final coded data) supplied via the transmission medium 3 or the recording medium 4 (FIG. 1) is supplied to a decoder 21.

The decoder 21 decodes the embedded data into the intermediate coded data (media data having the embedded advertisement data therein) and the decoding presentation program embedded in the intermediate coded data, and supplies them to a program executer 22.

The program executer 22 includes a decoder 23 and a data presenter 24. By executing the decoding presentation program from the decoder 21, the program executer 22 decodes the intermediate coded data supplied from the decoder 21 into the media data and the advertisement data, and presents the media data and the advertisement data.

That is, the decoder 23 decodes the intermediate coded data into the media data and the advertisement data embedded in the media data according to the decoding presentation program to be executed, and supplies the decoded media data and the decoded advertisement data to the data presenter 24.

The data presenter 24 displays the media data and the advertisement data on a display unit (not shown) or outputs them from a speaker (not shown) according to the decoding presentation program. For example, the decoding presentation program may control the display order such that the media data is displayed upon completion of the display of the advertisement data, or controls the output order such that the media data (audio data) is output upon completion of the display of the advertisement data. Alternatively, the decoding presentation program may control the display or the output of the data such that the advertisement data is displayed or output simultaneously with the media data.

The processing performed by the decoding device 2 shown in FIG. 4 is described below with reference to FIG. 5.

Upon receiving the embedded data, in step S11, the decoder 21 decodes the embedded data into the intermediate coded data and the decoding presentation program embedded in the intermediate coded data, and supplies the intermediate coded data and the decoding presentation program to the program executer 22.

In step S12, the program executer 22 starts executing the decoding presentation program supplied from the decoder 21, and the process proceeds to step S13. In step S13, the decoder 23 decodes the intermediate coded data supplied from the decoder 21 into the media data and the advertisement data according to the decoding presentation program to be executed, and supplies the decoded media data and the decoded advertisement data to the data presenter 24. The data presenter 24 presents the media data and the advertisement data according to the decoding presentation program, and the processing is then completed.

The decoding device 2 performs the processing indicated by the flowchart of FIG. 5 every time the embedded data is supplied.

As described above, the coding device 1 embeds the advertisement data into the media data so as to generate intermediate coded data. The coding device 1 then embeds the decoding presentation program required for decoding the intermediate coded data into the media data and for decoding the advertisement data into the intermediate coded data so as to generate final coded data as the embedded data. The decoding device 2 decodes the embedded data into the intermediate coded data and the decoding presentation program, and decodes the intermediate coded data into the media data and the advertisement data according to the decoding presentation program. According to the coding device 1 and the decoding device 2 in this embodiment, the embedded data encoded by the coding device 1 is decoded by the decoding device 2, thereby reliably presenting the advertisement data to the users.

More specifically, the media data and the advertisement data are encoded as the intermediate coded data, namely, the advertisement data is embedded in the media data, and the media data cannot be viewed (or listened to) without certain processing. That is, in order to view the media data, as shown in FIG. 6, the embedded data is first decoded into the intermediate coded data and the decoding presentation program, and the intermediate coded data is decoded into the media data and the advertisement data according to the decoding presentation program. Accordingly, the media data cannot be viewed on its own, and it has to be viewed with the advertisement data. As a result, every time the user attempts to view the media data, he/she looks at the advertisement data without fail.

The decoding presentation program for decoding the intermediate coded data into the media data and the advertisement data is embedded in the intermediate coded data (conversely, the intermediate coded data may be embedded into the decoding presentation program). Thus, the overall amount of data is not increased, as discussed in detail below.

The decoding presentation program includes a program, not only for decoding the intermediate coded data into the media data and the advertisement data, but also for presenting the media data and the advertisement data, so that the advertisement data can be presented to the user in accordance with the requirements of the provider (advertiser).

The approach to encoding the media data and the advertisement data is not restricted to an embedding technique, and it is possible to separately encode the media data and the advertisement data by using another encoding technique. In this case, however, a dishonest user may decode only the media data.

In contrast, by embedding the advertisement data in the media data (or embedding the media data in the advertisement data), the media data and the advertisement data are integrated, and it is impossible to decode only type of data. Thus, it is possible to prevent a dishonest user from decoding only the media data.

The above-described data processing apparatus can be used in, for example, a download system for downloading data via a network, such as the Internet.

Figure 7:
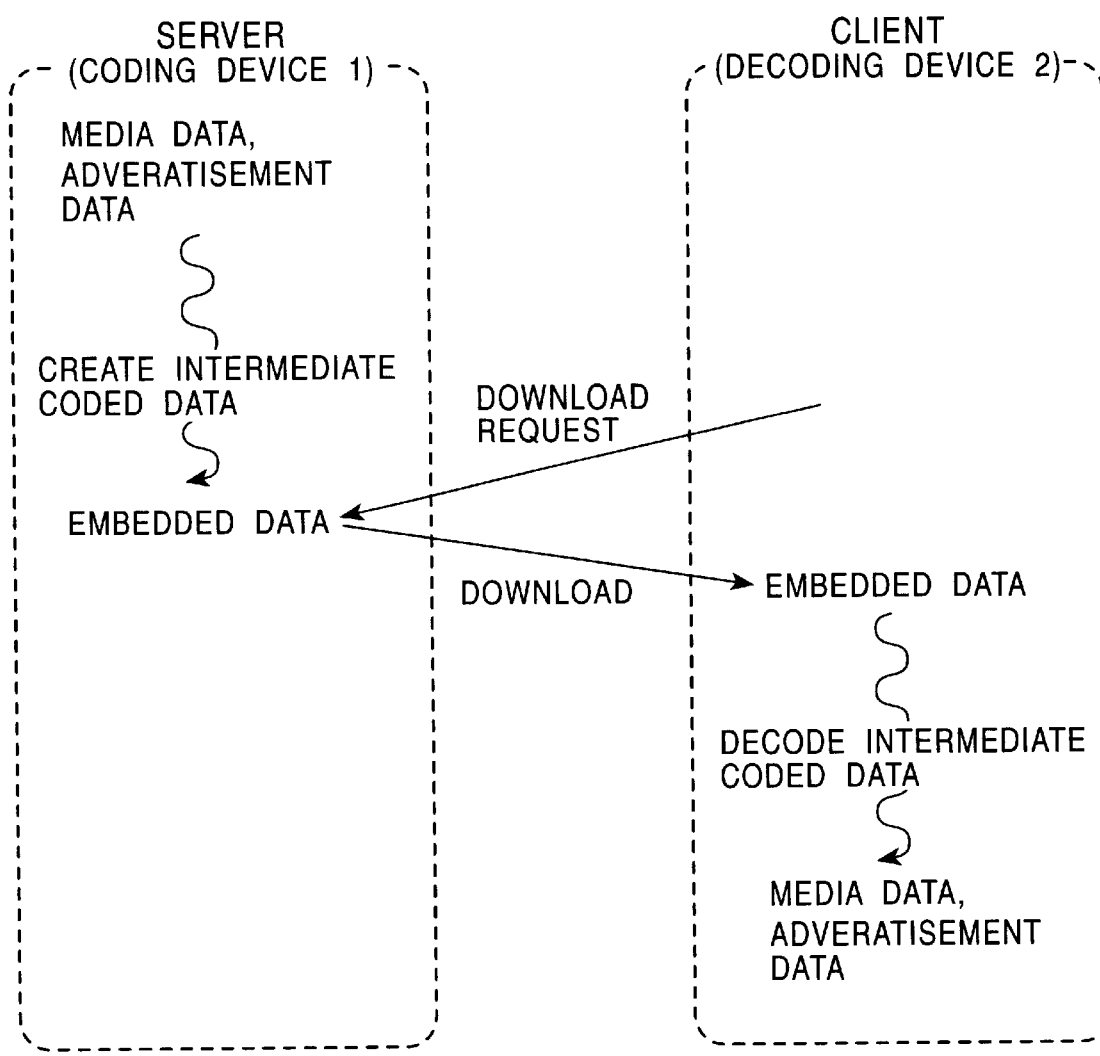
FIG. 7 illustrates a download system using the data processing apparatus shown in FIG. 1.

More specifically, in this case, the download system can be formed of, as shown in FIG. 7, a server, which serves as the coding device 1, and a client, which serves as the decoding device 2.

In the download system shown in FIG. 7, the client sends a download request for a certain item of media data to the server. In response to the request, the server embeds advertisement data in the requested media data so as to generate intermediate coded data as the embedded data, and also embeds a decoding presentation program in the intermediate coded data, thereby generating embedded data as final coded data. The client downloads the embedded data and decodes it into the intermediate coded data and the decoding presentation program. The client then decodes the intermediate coded data into the media data and the advertisement data according to the decoding presentation program. As a result, the media data and the advertisement are presented according to the decoding presentation program.

Accordingly, when the user attempts to view the media data at the client side, the advertisement data is decoded and presented to the user without fail. Thus, according to the data processing apparatus shown in FIG. 1, added value can be provided for the network advertisement business.

A description is now given of the embedding method employed in the integrator 11 and the embedding coder 13 of the coding device 1 (FIG. 2) and the decoding method employed in the decoder 21 and the decoder 23 of the decoding device 2 (FIG. 4).

The embedding method can be largely divided into two types of methods. In one method, embedding is performed by using correlation of the data to be embedded, and in the other method, embedding is performed without using correlation of the data to be embedded. The embedding method without using data correlation is discussed first.

Embedding Method Without Using Data Correlation

As the embedding method without using data correlation, the following technique, for example, is employed. Data into which other data is to be embedded (hereinafter referred to as "embedding target data"), such as the above-described media data or the intermediate coded data, is encoded according to a predetermined coding rule, and the coding rule is then modified based on the data to be embedded (hereinafter referred to as the "embedding additional data" or "additional data") into the coded data, such as the above-described advertisement data or the decoding presentation program, thereby embedding the data into the embedding target data.

Figure 8:
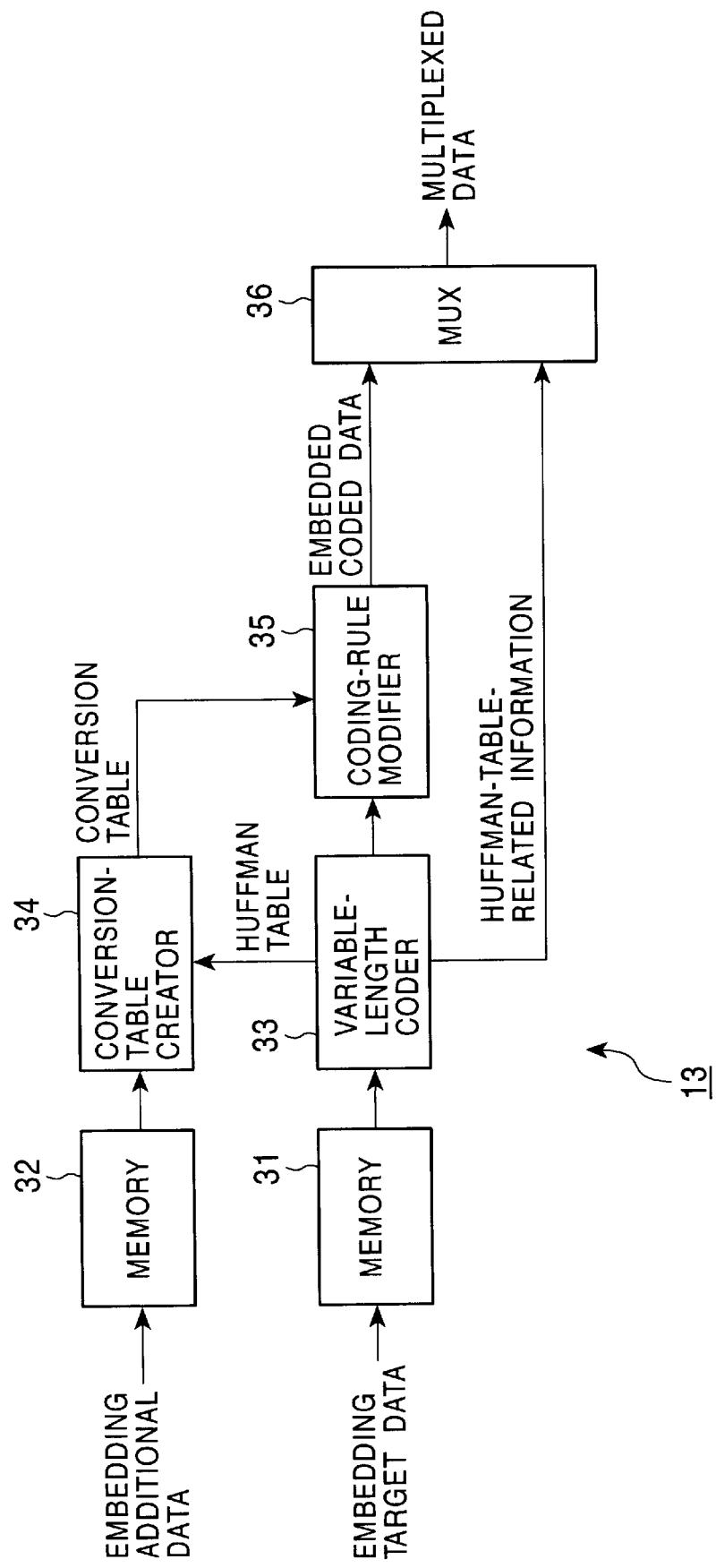
FIG. 8 is a block diagram illustrating a first example of the configuration of an integrator 11 (embedding coder 13)

FIG. 8 illustrates a first example of the configuration of the integrator 11 (or embedding coder 13) shown in FIG. 2 when the embedding operation is performed according to the above-described embedding method.

A memory 31 stores embedding target data supplied to the integrator 11 in predetermined units. A memory 32 stores additional data supplied to the integrator 11 in predetermined units.

A variable-length coder 33 encodes the embedding target data stored in the memory 31 by using, for example, the Huffman coding method, and supplies the resulting coded data to a coding-rule modifier 35. The variable-length coder 33 creates a Huffman table when performing Huffman coding according to a certain technique (discussed below), and then supplies the Huffman table to a conversion-table creator 34. The variable-length coder 33 also supplies Huffman-table-related information as the information required for obtaining the Huffman table stored in the conversion-table creator 34 to a multiplexer (MUX) 36.

The conversion-table creator 34 creates a conversion table for converting the codes in the Huffman table supplied from the variable-length coder 33 based on the embedding additional data stored in the memory 32. That is, the Huffman table represents the correlation between the values to undergo Huffman coding (i.e., the embedding target data in FIG. 8) and the codes having individual coding lengths (coded data). The conversion-table creator 34 creates the conversion table for converting the codes in the Huffman table into codes based on the embedding additional data. The conversion table created in the conversion-table creator 34 is then supplied to the coding-rule modifier 35.

The coding-rule modifier 35 modifies the coding rule in the variable-length coder 33 based on the embedding additional data, thereby embedding the embedding additional data into the coded embedding target data. More specifically, the coding-rule modifier 35 converts (operates) the coded data (codes) output from the variable-length coder 33 according to the conversion table created by the conversion-table creator 34 based on the embedding additional data, thereby generating data encoded by the modified coding rule. The coded data is then supplied from the coding-rule modifier 35 to the MUX 36 as the embedded coded data in which the embedding additional data is embedded in the original coded data.

The MUX 36 multiplexes the embedded coded data supplied from the coding-rule modifier 35 with the Huffman-table-related information supplied from the variable-length coder 33, and outputs the resulting multiplexed data as the embedded data in which the embedding additional data is embedded in the embedding target data.

FIG. 9 illustrates the configuration of the variable-length coder 33 shown in FIG. 8.

The embedding target data stored in the memory 31 shown in FIG. 8 in predetermined units is read out to a frequency-table creator 41 and a coding portion 44.

The frequency-table creator 41 creates a frequency table representing the correlation between the values of the embedding target data and the frequencies of appearance of the values, and supplies the frequency table to a Huffman-tree creator 42. The frequency table is also supplied from the frequency-table creator 41 to the MUX 36 shown in FIG. 8 as the Huffman-table-related information.

In the embodiment shown in FIG. 9, the frequency table is used as the Huffman-table-related information. However, the Huffman-table-related information may be any type of information as long as it provides information for obtaining the Huffman table created by a Huffman-table creator 43. Accordingly, the Huffman table itself, created by the Huffman-table creator 43, may be used as the Huffman-table-related information.

The Huffman-tree creator 42 creates a Huffman tree based on the frequency table supplied from the frequency-table creator 41, and supplies the Huffman tree to the Huffman-table creator 43. The Huffman-table creator 43 creates a Huffman table based on the Huffman tree supplied from the Huffman-tree creator 42. That is, the Huffman-table creator 43 creates a Huffman table concerning the embedding target data in which a shorter length code is assigned to a value having a higher frequency of appearance (a longer length code is assigned to a value having a lower frequency of appearance). The Huffman table is supplied to the coding portion 44 and also to the conversion table creator 34 shown in FIG. 8.

The coding portion 44 converts the individual values of the embedding target data into the corresponding codes in the Huffman table supplied from the Huffman-table creator 43, thereby outputting variable-length coded data.

In the above-configured variable-length coder 33, the frequency table concerning the embedding target data is created in the frequency-table creator 41, and is supplied to the Huffman-tree creator 42. A Huffman tree is then created in the Huffman-tree creator 42 based on the frequency table, and is supplied to the Huffman-table creator 43. The Huffman-table creator 43 then creates the Huffman table based on the Huffman tree, and supplies it to the coding portion 44. The coding portion 44 then converts the individual values of the embedding target data into the corresponding codes in the Huffman table. As a result, the variable-length coded data is output.

Details of the variable-length coding processing performed in the variable-length coder 33 are given below with reference to FIGS. 10A through 10F.

It is now assumed that the frequency table shown in FIG. 10A is created in the frequency-table creator 41. In FIG. 10A, the values "0", "1", "2", "3", and "4" of the embedding target data appear with frequencies "5", "4", "3", "2", and "1", respectively.

Based on the frequency table shown in FIG. 10A, a Huffman tree is created in the Huffman-tree creator 42, as shown in FIGS. 10B through 10E, based on the frequencies of appearance of the individual values of the embedding target data, according to a so-called bottom-up technique.

That is, the Huffman-tree creator 42 selects the two values having the lowest frequencies of appearance from the values of the frequency table so as to form a node therebetween. The Huffman-tree creator 42 also assigns, for example, bit "0", to the value having the lower frequency of appearance, and assigns bit "1" to the other value. Then, the Huffman-tree creator 42 assigns the sum of the frequencies of appearance of the two values to the node as the frequency of appearance.

Accordingly, in the frequency table shown in FIG. 10A, the value "4" having the frequency of appearance "1" and the value "3" having the frequency of appearance "2" are selected as the two lowest frequencies of appearance, as shown in FIG. 10B, so as to form node #1, and 3 (=1+2) is assigned to the node #1 as the frequency of appearance. Then, bit "0" is assigned to the value "4" having the lower frequency of appearance, and bit "1" is assigned to the other value "3" having the higher frequency of appearance.

In FIGS. 10B through 10E, the frequency of appearance is indicated in parentheses.

If the selected values have the same frequency of appearance, bit "0" or "1" may be assigned to either value. However, it should be determined in advance to which value bit "0" or "1" is assigned, for example, it is determined that bit "0" is assigned to the value having a lower frequency of appearance.

In the Huffman-tree creator 42, the above-described processing is repeated until the individual values converge to one node.

Accordingly, in FIG. 10C, node #1 and the value "2" having the frequency of appearance "3" are selected so as to form node #2. The frequency of appearance of node #2 is set to 6 (=3+3), and bit "0" is assigned to node #1 and bit "1" is assigned to the value "2".

In FIG. 10D, the value "1" having the frequency of appearance 4 and the value "0" having the frequency of appearance 5 are selected, and the two values "1" and "0" are formed into node #3. The frequency of appearance of node #3 is set to 9 (=4+5), and bit "0" is assigned to the value "1" and bit "1" is assigned to the value "0".

In FIG. 10E, node #2 having the frequency of appearance 6 and node #3 having the frequency of appearance 9 are selected, and nodes #2 and #3 are formed into node #4. The frequency of appearance of node #4 is set to 15 (=6+9), and bit "0" is assigned to node #2 and bit "1" is assigned to node #3.

In FIG. 10E, the individual values converge to one node #4, thus completing the Huffman tree. The Huffman-tree creator 42 supplies the Huffman tree to the Huffman-table creator 43.

The Huffman-table creator 43 traces back the Huffman tree from the converged node so as to identify the codes assigned to the individual values.

More specifically, the Huffman tree shown in FIG. 10E is traced back from node #4 toward the value "4", and the bits assigned to the nodes (or values) are arranged as in "0"→"0"→"0". Then, the Huffman-table creator 43 identifies "000" as the code assigned to the value "0". The Huffman tree shown in FIG. 10E is traced back from node #4 toward the value "3", and the bits assigned to the nodes are arranged as in "0"→"0"→"1". Then, the Huffman-table creator 43 identifies "001" as the code assigned to the value "1".

Similarly, the Huffman-table creator 43 identifies the codes assigned to the individual values so as to create a Huffman table indicating the relationships between the individual values of the embedding target data and the codes. Thus, the Huffman table shown in FIG. 10F is created from the Huffman tree shown in FIG. 10E.

In the Huffman table shown in FIG. 10F, the codes "11", "10", "01", "001", and "000" are respectively assigned to the values "0", "1", "2", "3", and "4" having the frequencies of appearance "5", "4", "3", "2", and "1", respectively. Generally, therefore, a code having a shorter length is assigned to a value having a higher frequency of appearance.

In the Huffman table shown in FIG. 10F, although the frequencies of appearance of the values "0", "1", "2", "3", and "4" are all different, a two-bit code is assigned to the values "0", "1", and "2" having a relatively higher frequency of appearance, while a three-bit code is assigned to the values "3" and "4" having a relatively lower frequency of appearance.

Figure 11:
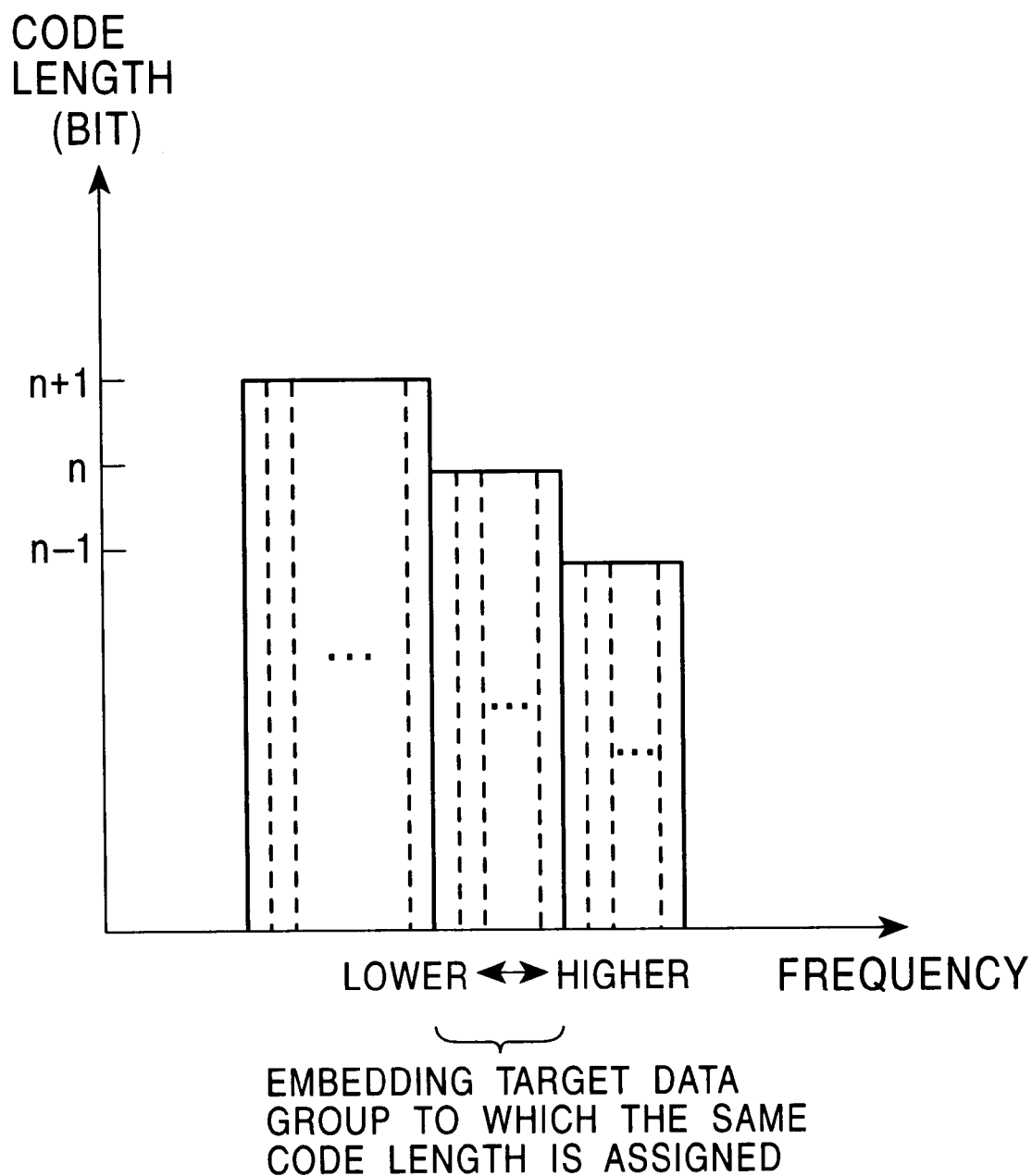
FIG. 11 is a graph illustrating the relationship between the frequencies of appearance of the individual values of embedding target data and code lengths assigned to the individual values.

In the Huffman table, the same length of codes are sometimes assigned to the values having different frequencies of appearance, and the relationship between the frequency of appearance and the code length is, in general, as shown in FIG. 11.

It is now assumed in FIG. 11 that there are x values to which an n-bit code is assigned (x is an integer lower than or equal to $2^n$). There are n! patterns (! indicates a factorial) for assigning the n-bit codes to the x values. In the Huffman table, only one of the x! patterns is employed based on the above-described rule for creating the Huffman tree.

On the other hand, even if the pattern for assigning the n-bit codes to the x values is changed, the number of codes is not increased. That is, in the Huffman table, even if an n-bit code is re-assigned to a certain value to which another n-bit code is already assigned, the assigned code length remains n bits, and thus, the number of code is not increased.

Additionally, even if the assignment pattern for the n-bit codes to the x values is changed in the Huffman table, the assignment pattern can be restored based on the frequencies of appearance of the x values.

As discussed above, even by changing the assignment pattern for the same-length codes assigned to the values in the Huffman table, i.e., even by modifying the variable-length coding rule, the number of codes is not increased, and the modified assignment pattern can be restored.

This means that information can be embedded by changing the assignment pattern for the codes to the individual values of the embedding target data based on certain information without increasing the number of codes, and that the embedded information can be decoded without incurring an overhead.

FIG. 12 illustrates an example of the Huffman table created for the individual values (0 to 255) of the 8-bit embedding target data. FIG. 12 shows not only the individual values and the corresponding codes (variable-length coded data), but also the frequencies of appearance of the individual values.

In FIG. 12, seven values from "12" to "18" are extracted by way of example, and 9-bit codes are assigned to the seven values, and there are thus 7! assignment patterns for the 9-bit codes to the seven values. Accordingly, by changing the assignment pattern for the 9-bit codes, int[$\log_2 7!$]-bit information can be embedded. It should be noted that int[ ] indicates the maximum integer smaller than or equal to the value in [ ].

Figure 13:
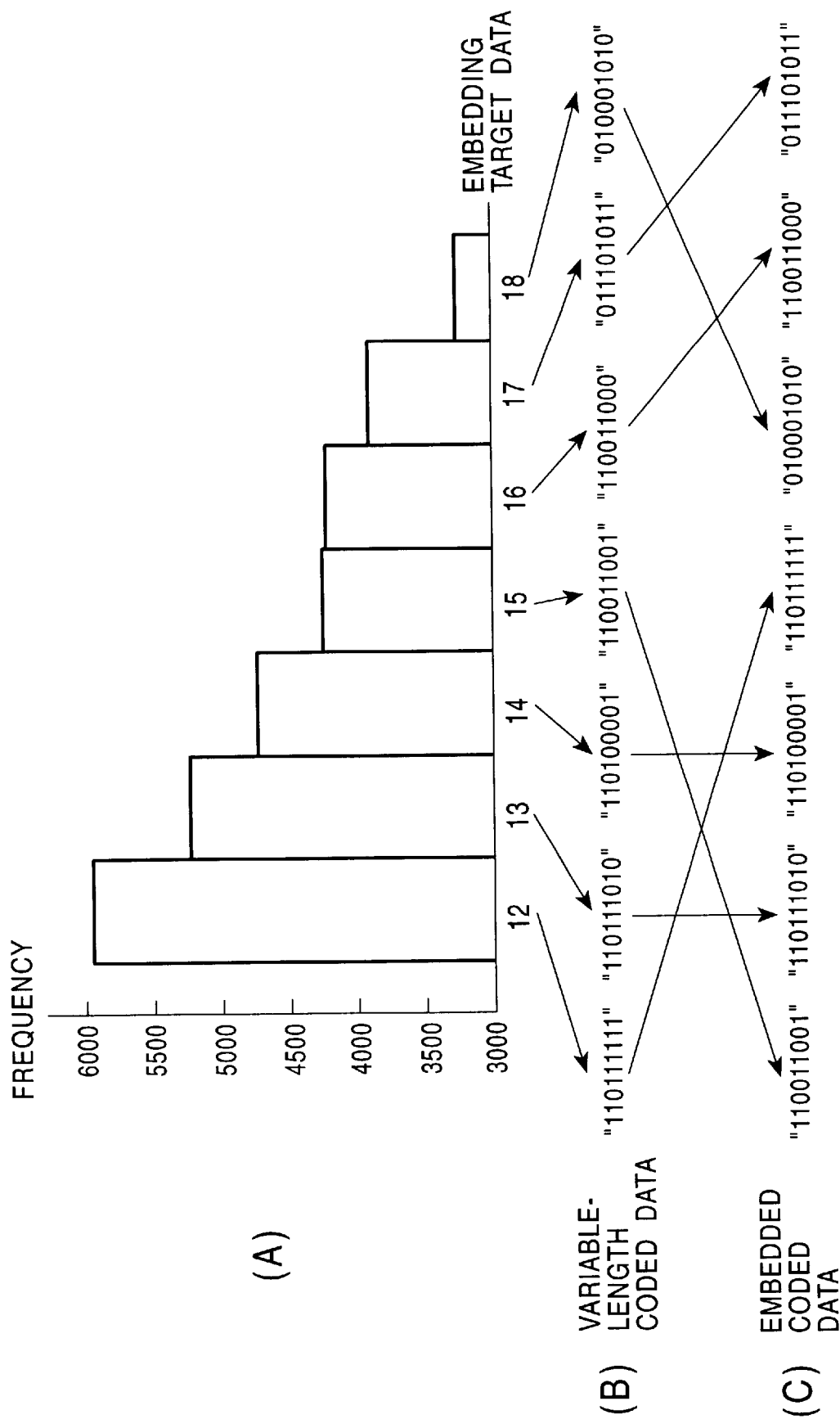
FIG. 13 illustrates assigned codes and code conversion.

The graph indicated by (A) of FIG. 13 illustrates the frequencies of appearance of the values "12" to "18" shown in FIG. 12. The 9-bit codes (variable-length coded data) assigned to the values "12" to "18" are shown in (B) of FIG. 13.

The 9-bit codes shown in (B) of FIG. 13 are changed to those shown in (C) of FIG. 13 based on the embedding additional data which is smaller than or equal to int[$\log_2 7!$] bits.

More specifically, in (B) of FIG. 13, codes "110111111", "110111010", "110100001", "110011001", "110011000", "011101011", and "010001010" are assigned to the values "12" through "18", respectively. In (C) of FIG. 13, the code "110111111" assigned to the value "12" is re-assigned to the value "15", the code "110011001" assigned to the value "15" is re-assigned to the "12", the code "110011000" assigned to the value "16" is re-assigned to the value "17", the code "011101011" assigned to the value "17" is re-assigned to the value "18", and the code "010001010" assigned to the value "18" is re-assigned to the value "16". In FIG. 13, the assignment pattern for the codes to the other values is not changed.

Concerning the values to which the other length codes are assigned, the assignment pattern can also be changed based on the embedding additional data. FIG. 14 illustrates embedded coded data (variable-length coded data) obtained by changing the assignment pattern shown in FIG. 12 based on the embedding additional data. FIG. 14 illustrates not only the embedded coded data, but also the decoded values obtained by variable-length-decoding the embedded coded data according to the Huffman table shown in FIG. 12 (values decoded by the Huffman table used for obtaining correct variable-length coded data).

Figure 15:
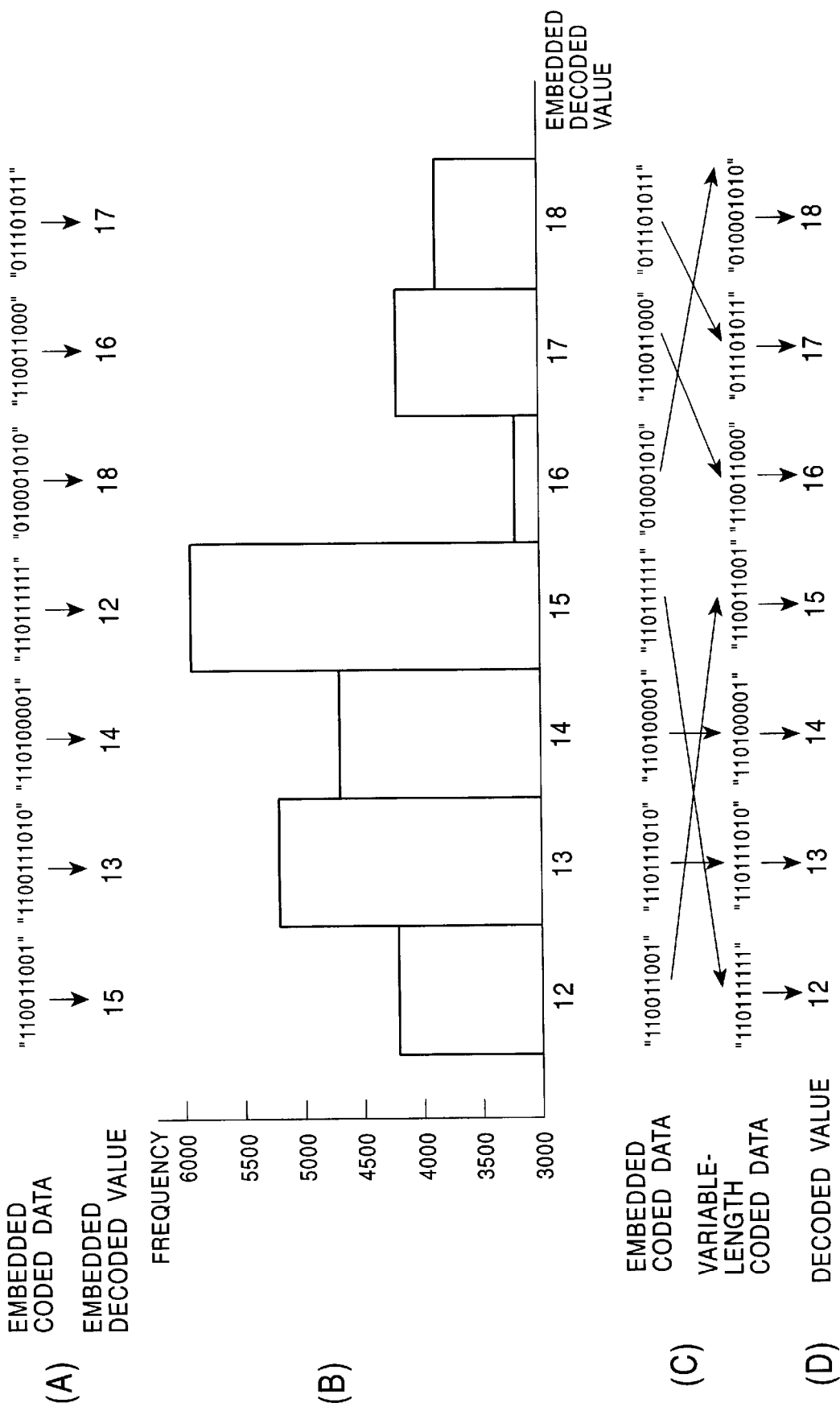
FIG. 15 illustrates a method for decoding embedded data into original variable-length coded data.

In FIG. 14, the seven values "12" through "18" are extracted by way of example. The embedded coded data is decoded based on the Huffman table shown in FIG. 12, and then, the decoded values as indicated by (A) of FIG. 15 are obtained. That is, the codes "110011001", "110111010", "110100001", "110111111", "010001010", "110011000", and "011101011" are variable-length decoded into the embedded decoded values "15", "13", "14", "12", "18", "16", and "17", respectively, according to the Huffman table used for encoding the data.

The frequencies of appearance of the embedded decoded values "12" through "18" are indicated in (B) of FIG. 15. As discussed above, the codes assigned to the values "12" through "18" in the Huffman table shown in FIG. 12 are changed, as shown in (B) and (C) of FIG. 13. Accordingly, the frequencies of appearance of the values "12", "15", "16", "17", and "18" indicated in (B) of FIG. 15 do not coincide with those shown in (A) of FIG. 13, but coincide with those of the pre-variable-length-coded values "15", "12", "18", "16", and "17", respectively.

However, the frequencies of appearance of the decoded values "12" through "18" should be the same as those of the original pre-variable-length-coded values "12" through "18", respectively.

Accordingly, the frequencies of appearance of the original pre-coded values shown in (A) of FIG. 13 are compared with those of the decoded values indicated in (B) FIG. 15 so as to determine which pre-coded values and which decoded values have the same frequency of appearance. Thus, the assignment pattern which has been changed based on the embedding additional data can be rearranged to the original pattern. That is, the embedded coded data can be restored to the variable-length data coded by the Huffman table. Then, according to the assignment pattern used for restoring the embedded coded data into the variable-length coded data, the embedded additional data in the embedded target data (variable-length coded data) can be reproduced, and the variable-length coded data is decoded into the original embedding target data.

More specifically, by comparing the frequencies of appearance of the original values indicated in (A) of FIG. 13 with those of the embedded decoded values indicated in (B) of FIG. 15, the frequencies of appearance of the embedded decoded values "15", "13", "14", "12", "18", "16", and "17" coincide with those of the original values "12" through "18", respectively.

As a result, it can be determined that the embedded coded data "110011001", "110111010", "110100001", "110111111", "010001010", "110011000", and "011101011" corresponding to the decoded values "15", "13", "14", "12", "18", "16", and "17", respectively, were originally "110111111", "110111010", "110100001", "110011001", "11011000", "011101011", and "010001010" assigned to the original values "12" through "18", respectively, in the Huffman table shown in FIG. 12 before the embedding additional data is embedded therein.

Accordingly, the embedded coded data is decoded, as indicated in (C) of FIG. 15, so that the frequencies of appearance of the original values shown in (A) of FIG. 13 are equal to those of the embedded decoded values indicated in (B) of FIG. 15. Thus, the variable-length data coded by the Huffman table shown in FIG. 12 can be restored, and also, the embedded additional data can be reproduced according to the relationship between the embedded coded data and the restored variable-length coded data. Additionally, the restored variable-length coded data is variable-length decoded, as indicated in (D) of FIG. 15, into the original embedding target data values.

In the integrator 11 (embedding coder 13) shown in FIG. 8, embedding coding processing can be performed without increasing the amount of data, so that decoding can be performed without incurring an overhead.

Figure 16:
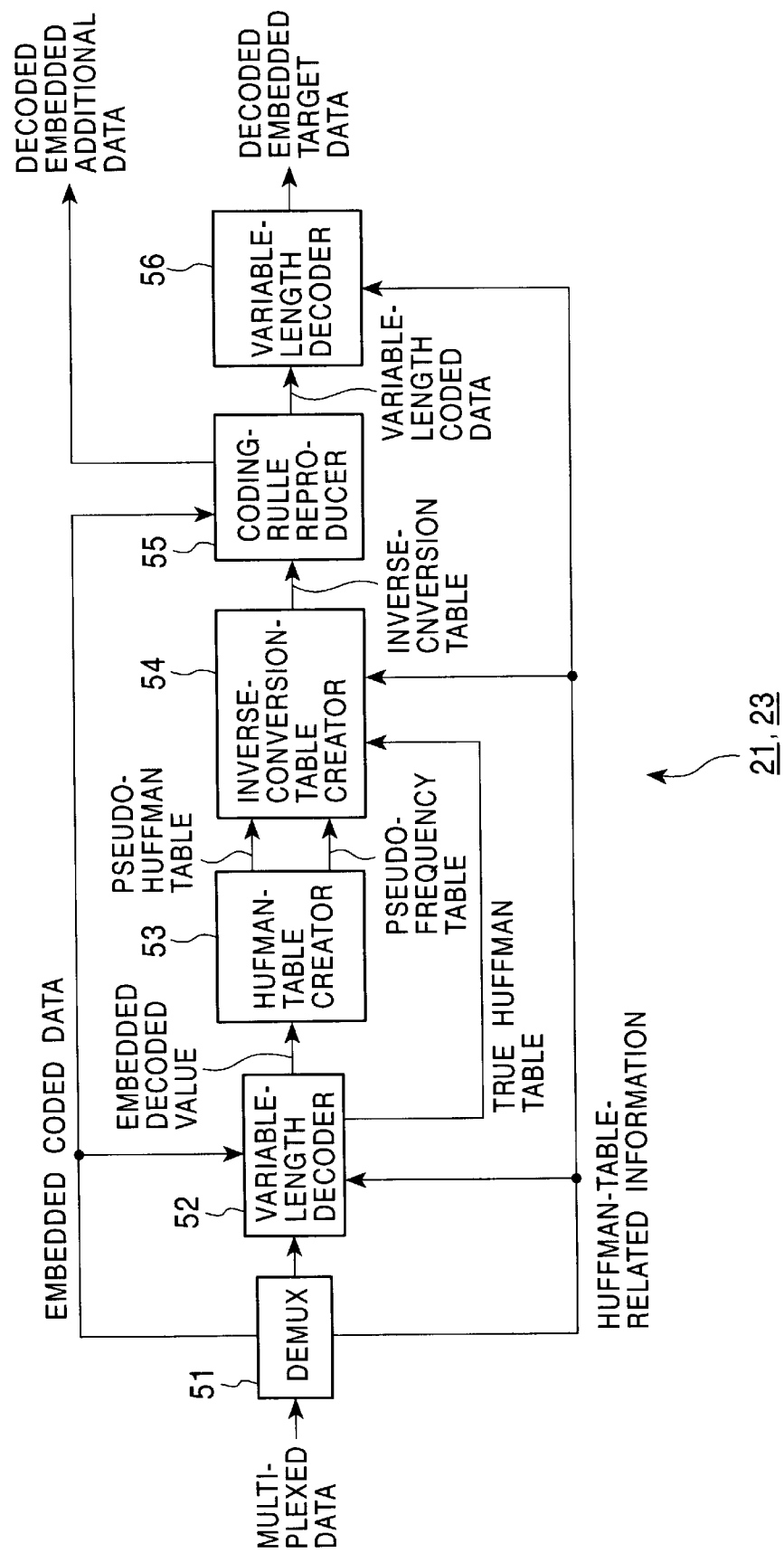
FIG. 16 is a block diagram illustrating a first example of the configuration of a decoder 21 (23)

FIG. 16 illustrates the configuration of the decoder 21 (or decoder 23) shown in FIG. 4 when the integrator 11 (embedding coder 13) shown in FIG. 2 is configured as shown in FIG. 8.

The multiplexed data consisting of the embedded data (multiplexed data) and the Huffman-table-related information output from the integrator 11 shown in FIG. 8 is supplied to a demultiplexer (DEMUX) 51. The DEMUX 51 separates the multiplexed data into the embedded coded data and the Huffman-table-related information. The DEMUX 51 then supplies the embedded coded data to a variable-length decoder 52 and a coding-rule reproducer 55, and supplies the Huffman-table-related information to the variable-length decoder 52, an inverse-conversion-table creator 54, and a variable-length decoder 56.

Upon receiving the embedded coded data and the Huffman-table-related information from the DEMUX 51, the variable-length decoder 52 creates a Huffman table from the frequency table, which serves as the Huffman-table-related information, in a manner similar to the variable-length coder 33 shown in FIG. 9, and supplies the Huffman table to the inverse-conversion-table creator 54.

The Huffman table created from the frequency table, which serves as the Huffman-table-related information, is the same as the Huffman table used for performing variable-length coding in the variable-length coder 33 shown in FIG. 8, and is thus referred to as a "true Huffman table". The frequency table as the Huffman-table-related information used for obtaining the true Huffman table is referred to as the "true frequency table".

The variable-length decoder 52 also performs variable-length decoding on the embedded coded data according to the true Huffman table, and supplies the resulting decoded values (embedded decoded values) of the embedded target data to a Huffman-table creator 53.

The Huffman-table creator 53 creates a Huffman table for performing variable-length coding on the embedded coded values supplied from the variable-length decoder 52, and supplies the Huffman table and a frequency table which is created while the Huffman table is being created to the inverse-conversion-table creator 54.

The Huffman table created by the Huffman table creator 53 is used for performing variable-length coding on the embedded decoded values (which is obtained by performing variable-length decoding on the embedded coded data by the true Huffman table), and correct variable-length coded data cannot be correctly decoded by using this Huffman table. Accordingly, this Huffman table is referred to as the "pseudo-Huffman table". The frequency table used for obtaining the pseudo-Huffman table is referred to as a "pseudo-frequency table".

The inverse-conversion-table creator 54 creates an inverse-conversion table for converting the embedded coded data into the original variable-length coded data based on the true Huffman table supplied from the variable-length decoder 52, the true frequency table supplied from the DEMUX 51 as the Huffman-table-related information, and the pseudo-Huffman table and the pseudo-frequency table supplied from the Huffman table creator 53. That is, the inverse-conversion-table creator 54 creates the inverse conversion table which is the same as the conversion table created by the conversion-table creator 34 shown in FIG. 8. The inverse-conversion table is then supplied to the coding-rule reproducer 55.

Based on the inverse-conversion table supplied from the inverse-conversion-table creator 54, the coding-rule reproducer 55 restores the embedded coded data supplied from the DEMUX 51 into the variable-length data which has been coded by the true Huffman table according to the coding rule. The coding-rule reproducer 55 also reproduces the embedded additional data embedded in the embedded coded data based on the relationship between the embedded coded data and the reproduced variable-length coded data, i.e., based on the inverse-conversion table. The coding-rule reproducer 55 then outputs the decoded variable-length coded data to the variable-length decoder 56, and also outputs the decoded embedded additional data.

The variable-length decoder 56 creates the true Huffman table from the Huffman-table-related information supplied from the DEMUX 51. The variable-length decoder 56 then performs variable-length decoding on the variable-length coded data supplied form the coding-rule reproducer 55 based on the created true Huffman table, and outputs the resulting decoded values of the embedded target data (hereinafter referred to as "decoded embedded target data").

Figure 17:
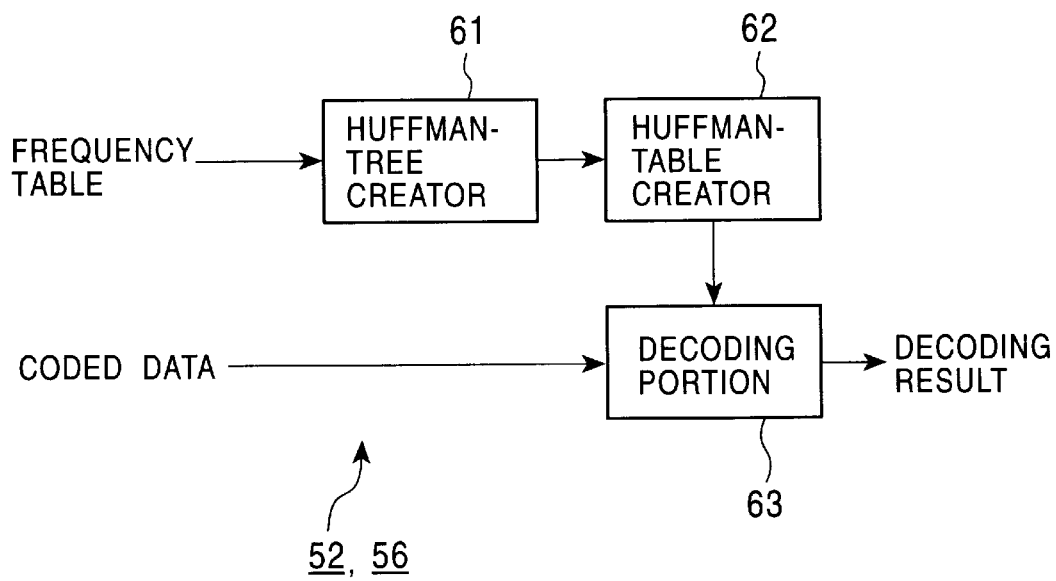
FIG. 17 is a block diagram illustrating the configuration of a variable-length decoder 52 (56)

FIG. 17 illustrates the configuration of the variable-length decoder 52 shown in FIG. 16.

The embedded coded data output from the DEMUX 51 is supplied to a decoding portion 63, and the frequency table output from the DEMUX 51 as the Huffman-table-related information is supplied to a Huffman-tree creator 61.

The Huffman-tree creator 61 creates a Huffman tree from the frequency table in a manner similar to the Huffman-tree creator 42 shown in FIG. 9, and supplies the Huffman tree to a Huffman-table creator 62.

The Huffman-table creator 62 creates a Huffman table from the Huffman tree from the Huffman-tree creator 61 in a manner similar to the Huffman-table creator 43 shown in FIG. 9, and supplies the Huffman table to the decoding portion 63.

The decoding portion 63 performs variable-length decoding on the embedded coded data according to the Huffman table from the Huffman-table creator 62, and outputs the decoding result.

The variable-length decoder 56 shown in FIG. 16 is configured similarly to the variable-length decoder 52 shown in FIG. 17.

Figure 18:
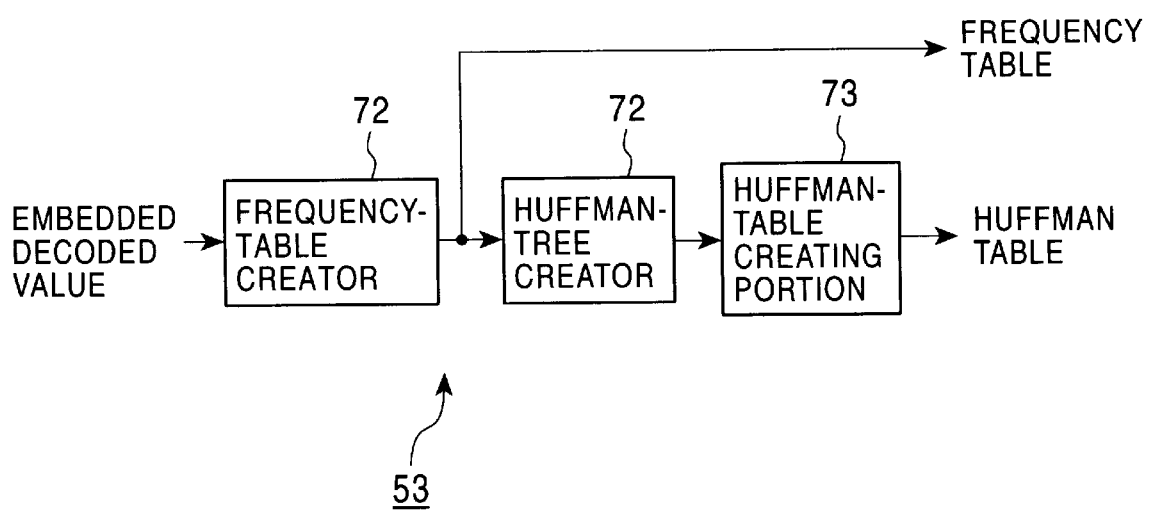
FIG. 18 is a block diagram illustrating a Huffman-table creator 53.

FIG. 18 illustrates the configuration of the Huffman-table creator 53 shown in FIG. 16.

In the Huffman-table creator 53, the embedded decoded values output from the variable-length decoder 52 are supplied to a frequency-table creator 71. The frequency-table creator 71, a Huffman-tree creator 72, and a Huffman-table creating portion 73 perform processing in a manner similar to the frequency-table creator 41, the Huffman-tree creator 42, and the Huffman-table creator 43, respectively, in FIG. 9.

In the frequency-table creator 71, a pseudo-frequency table concerning the embedded decoded data (different from the true frequency table concerning the original embedded target data) is created, and is supplied to the inverse-conversion-table creator 54 (FIG. 16). In the Huffman-table creating portion 73, the pseudo-Huffman table for converting the embedded decoded data into code lengths corresponding to the frequencies of appearance (which is not the true Huffman table concerning the original embedded target data) is created, and is supplied to the inverse-conversion-table creator 54.

Figure 19:
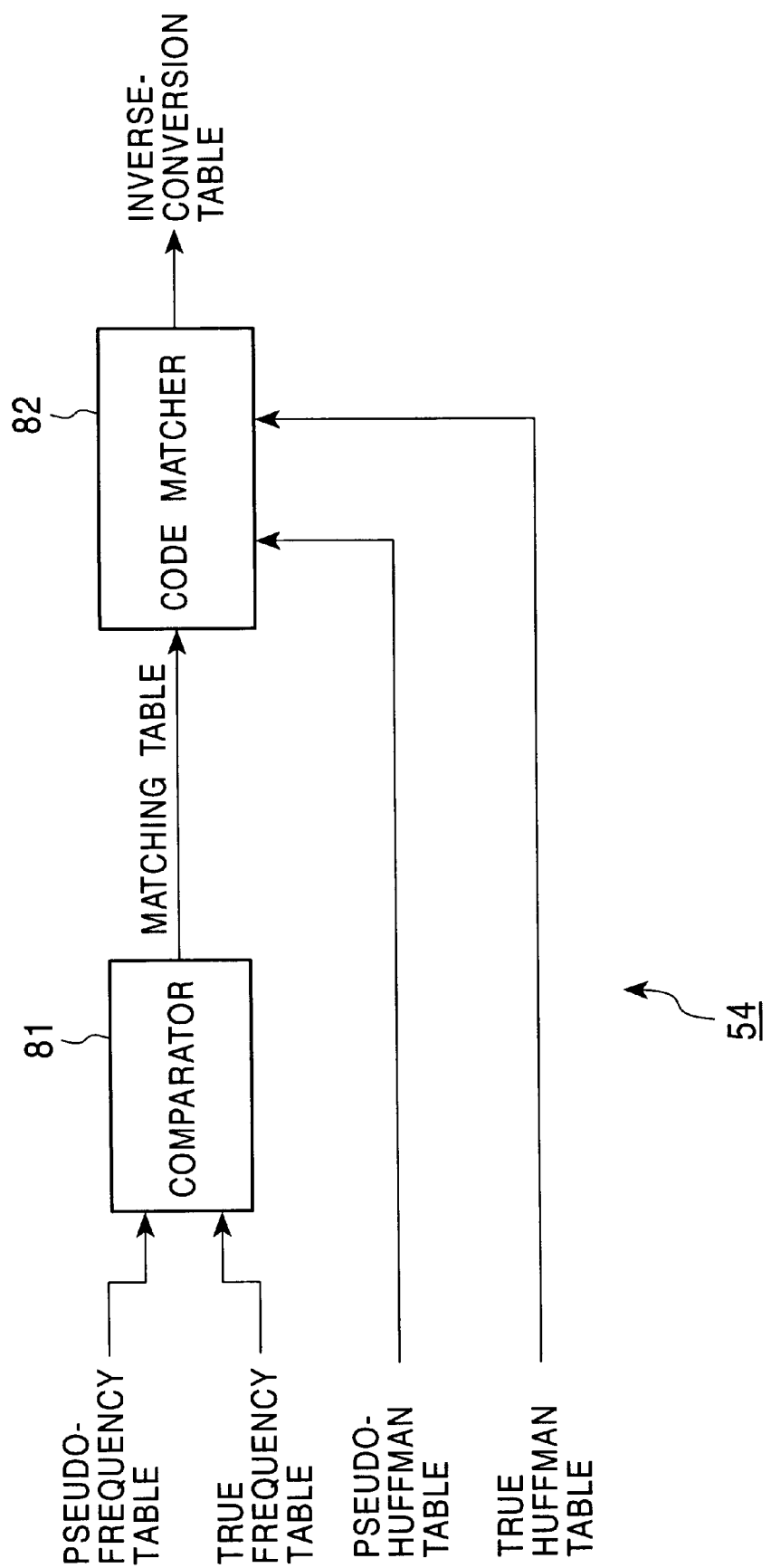
FIG. 19 is a block diagram illustrating the configuration of an inverse-conversion-table creator 54.

FIG. 19 illustrates the configuration of the inverse-conversion-table creator 54 shown in FIG. 16.

As discussed above, the true Huffman table, the true frequency table, the pseudo-Huffman table, and the pseudo-frequency table are supplied to the inverse-conversion-table creator 54. Based on these tables, the inverse-conversion-table creator 54 identifies the relationships between the embedded coded data and the variable-length data coded by the true Huffman table as discussed with reference to FIGS. 12 through 15, thereby creating the inverse-conversion table reflecting the identified relationships.

The true Huffman table and the pseudo-Huffman table are supplied to a code matcher 82, and the true frequency table and the pseudo-frequency table are supplied to a comparator 81.

The comparator 81 compares the true frequency table with the pseudo-frequency table, and detects the value in the true frequency table and the value in the pseudo-frequency table having the same frequency of appearance for each code. The comparator 81 then creates a matching table in which the values in the true frequency table and the values in the pseudo-frequency table having the same frequencies of appearance correspond to each other, and supplies the matching table to the code matcher 82.

The code matcher 82 searches the true Huffman table and the pseudo-Huffman table for the matching values in the matching table supplied from the comparator 81, and then creates the inverse-conversion table according to the matched values. The inverse-conversion table is then supplied to the coding-rule reproducer 55.

Vector Quantizing

Figure 20:
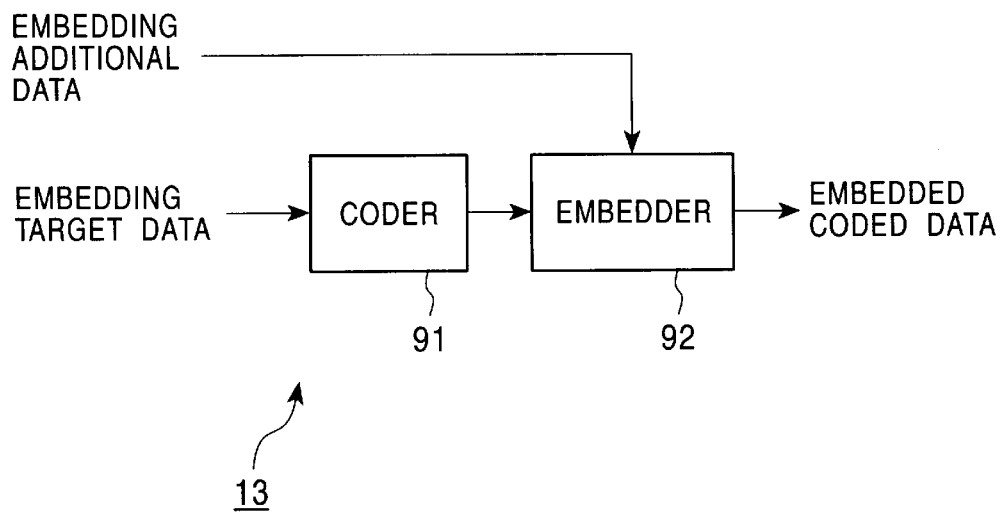
FIG. 20 is a block diagram illustrating a second example of the configuration of the integrator 11 (embedding coder 13)

FIG. 20 illustrates a second example of the configuration of the integrator 11 (embedding coder 13) shown in FIG. 2 when the embedding target data is coded according to a predetermined coding rule, and when the embedding additional data is embedded in the embedding target data by modifying the coding rule based on the embedding additional data.

The embedding target data is supplied to a coder 91, and the coder 91 codes the embedding target data according to a predetermined rule, and outputs the resulting coded data to an embedder 92.

The embedded additional data is supplied to the embedder 92, and the embedder 92 processes the coded data supplied from the coder 91 based on the embedding additional data so as to convert the coded data according to the modified coding rule. The embedder 91 then embeds the embedding additional data into the coded embedding target data, thereby outputting the embedded coded data.

Figure 21:
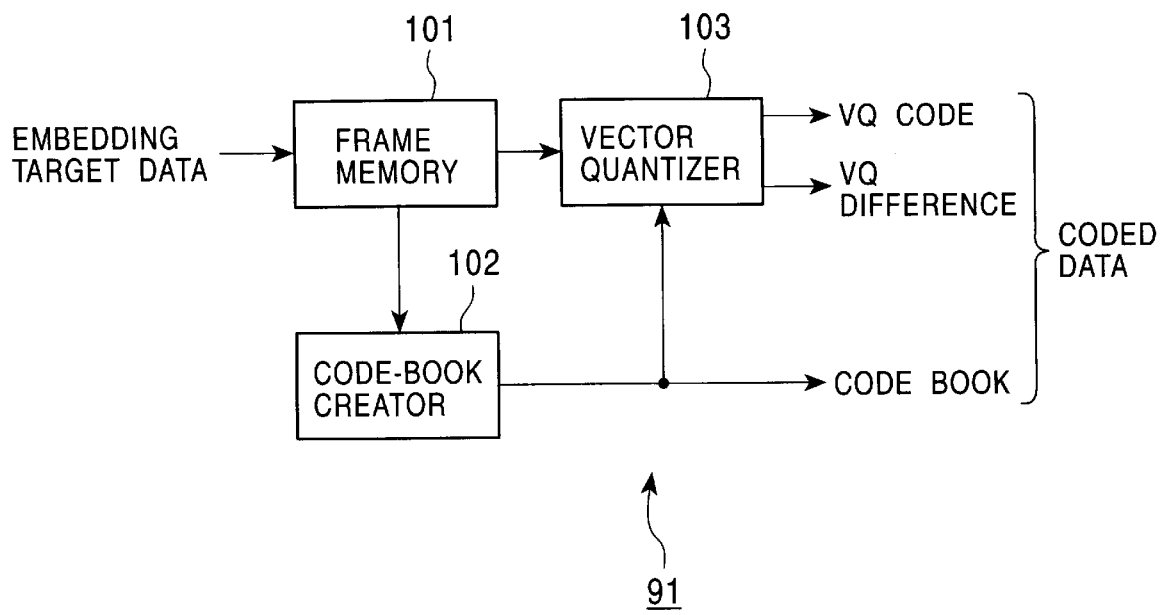
FIG. 21 is a block diagram illustrating the configuration of a coder 91.

FIG. 21 illustrates the configuration of the coder 91 shown in FIG. 20. It is now assumed that the embedding target data is image data, and pixel values of the image data are indicated by red (R), green (G), and blue (B).

In the coder 91 shown in FIG. 21, the pixel values of the embedding target data are vector-quantized in an RGB color space, and a code representing the centroid vector (hereinafter referred to as the "VQ code"), the error of the pixel value represented by the centroid vector with respect to the original pixel value (hereinafter referred to as the "VQ difference"), and a code-book used for performing vector quantizing are output as the coded data.

More specifically, the embedding target data (image data) is supplied to a frame memory 101, and the frame memory 101 sequentially stores the image data, for example, in units of frames therein.

A code-book creator 102 sequentially selects the frames forming the embedding target data stored in the frame memory 101, and creates a code-book used for performing vector quantizing in the corresponding color space from the individual pixel values forming the selected frame according to, for example, a so-called Linde, Buzo, Gray (LBG) algorithm. The created code-book is supplied to a vector quantizer 103, and is also output as (part of) the coded data.

The vector quantizer 103 reads the selected frame from the frame memory 101, and sequentially selects the individual pixels forming the selected frame in the order of, for example, raster scanning. The vector quantizer 103 then vector-quantizes the pixel value of the selected pixel by using the code book supplied from the code-book creator 102, and outputs the resulting VQ code and the VQ difference as (part of) the coded data.

Figure 22:
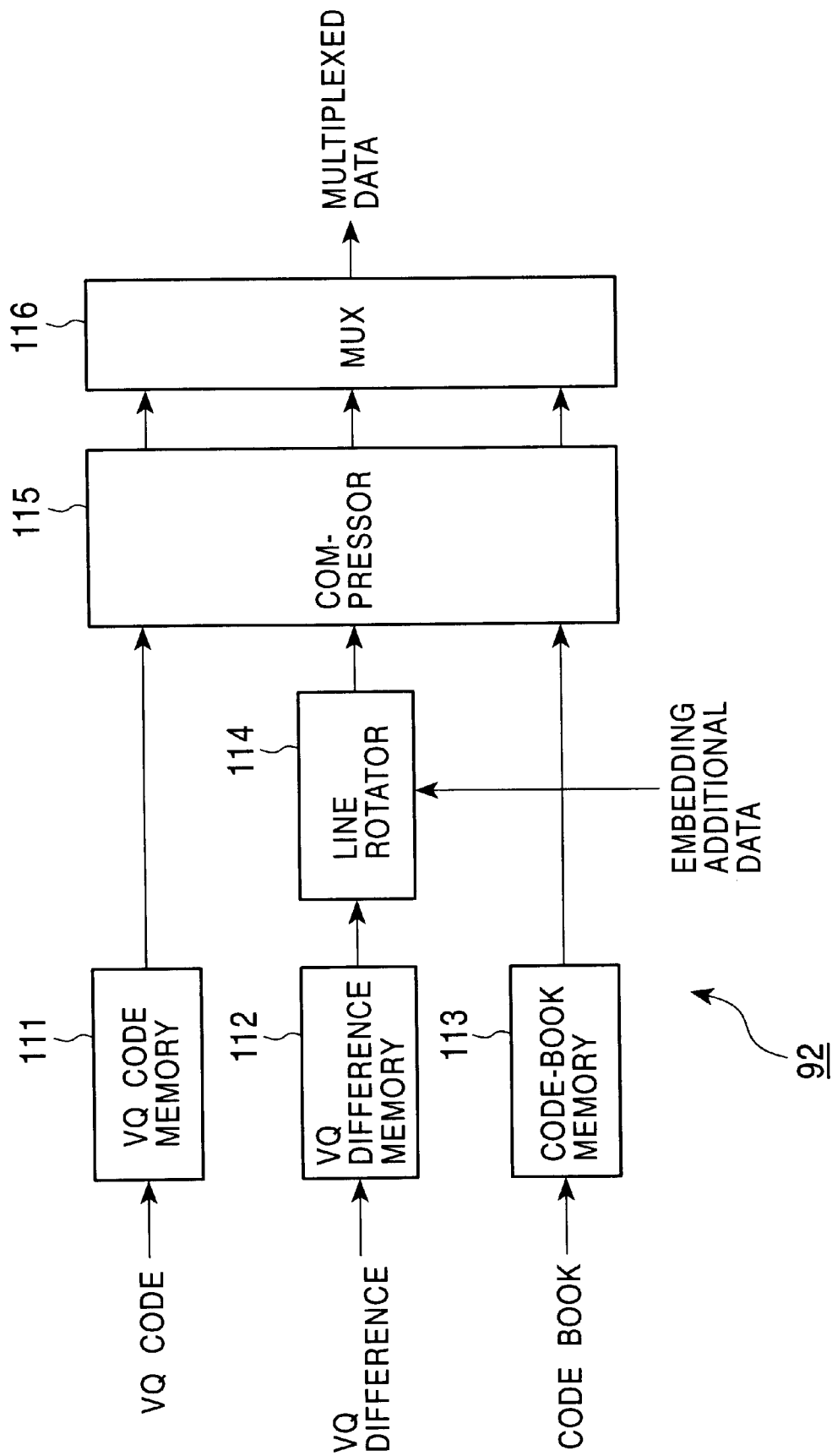
FIG. 22 is a block diagram illustrating the configuration of an embedder 92.

FIG. 22 illustrates the configuration of the embedder 92 shown in FIG. 20 when the coder 91 is configured as shown in FIG. 21.

The VQ code, the VQ difference, and the code book of the selected frame output from the coder 91 as the coded data are supplied to and stored in a VQ code memory 111, a VQ difference memory 112, and a code-book memory 113, respectively.

The VQ code stored in the VQ code memory 111 and the code book stored in the code-book memory 113 are read out to a compressor 115.

Figure 23:
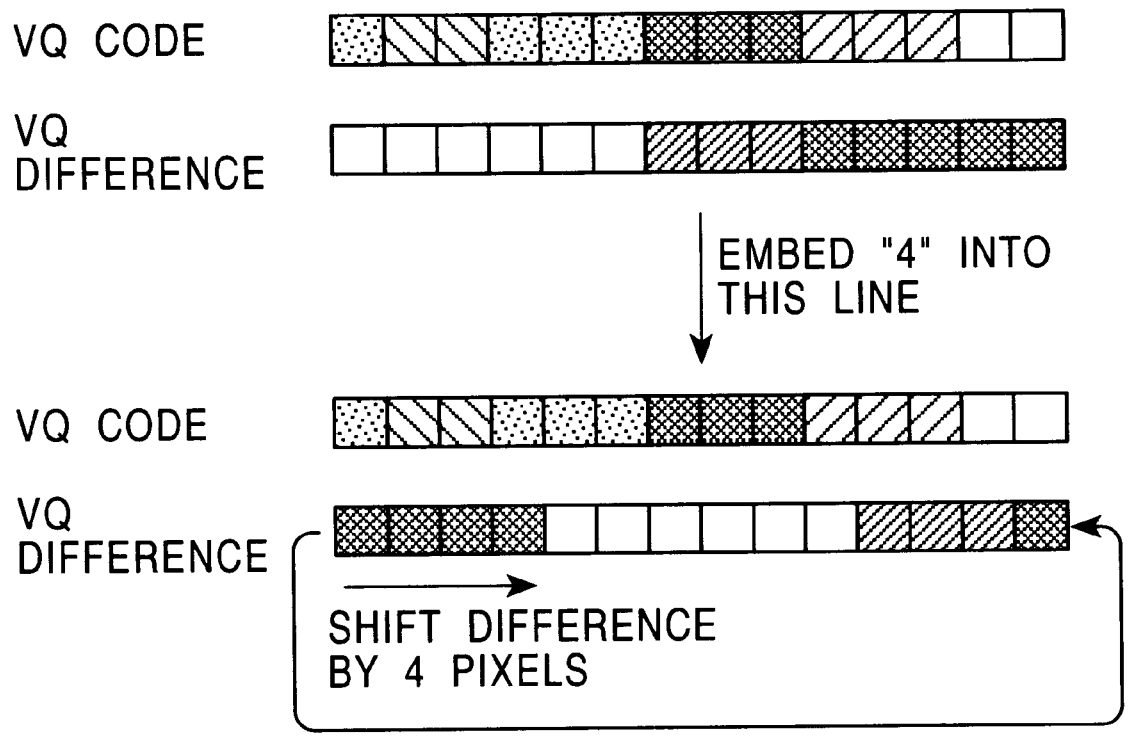
FIG. 23 illustrates embedding of embedding additional data by line rotation.

A line rotator 114 sequentially selects the lines (horizontal lines) of the selected frame, for example, from the top to the bottom, and reads the VQ difference of the selected line stored in the VQ difference memory 112. It is now assumed that the number of pixels forming the selected line is x. Then, the line rotator 114 receives the embedding additional data having int[$\log_2 x$] bits, and rotates the VQ difference of the selected line to the right by an amount, for example, as shown in FIG. 23, equal to the number of pixels of the embedding additional data, thereby embedding the additional data into the selected line. The above-described line rotation is now considered by taking a certain pixel of the selected line by an example. By performing the line rotation, the VQ difference of the above-described pixel basically becomes different from the VQ difference obtained by performing vector quantizing. That is, the vector-quantizing coding rule is modified, thereby embedding the additional data.

Thereafter, the line rotator 114 supplies the VQ difference of the selected line having the embedded additional data to the compressor 115.

When the VQ difference of the selected line is rotated to the right in the line rotator 114, the VQ difference of the pixel at the right end of the selected line is rotated to the pixel of the left end of the selected line. Similarly, when the VQ difference of the selected line is rotated to the left, the VQ difference of the pixel at the left end of the selected line is rotated to the pixel at the right end.

The compressor 115 compresses the VQ code, the VQ difference, and the code book by utilizing, for example, space correlation or entropy distribution, and outputs the compression results to an MUX 116. The MUX 116 multiplexes the compression results of the VQ code, the VQ difference, and the code book supplied from the compressor 115, and outputs the resulting multiplexed data as the embedded coded data.

Figure 24:
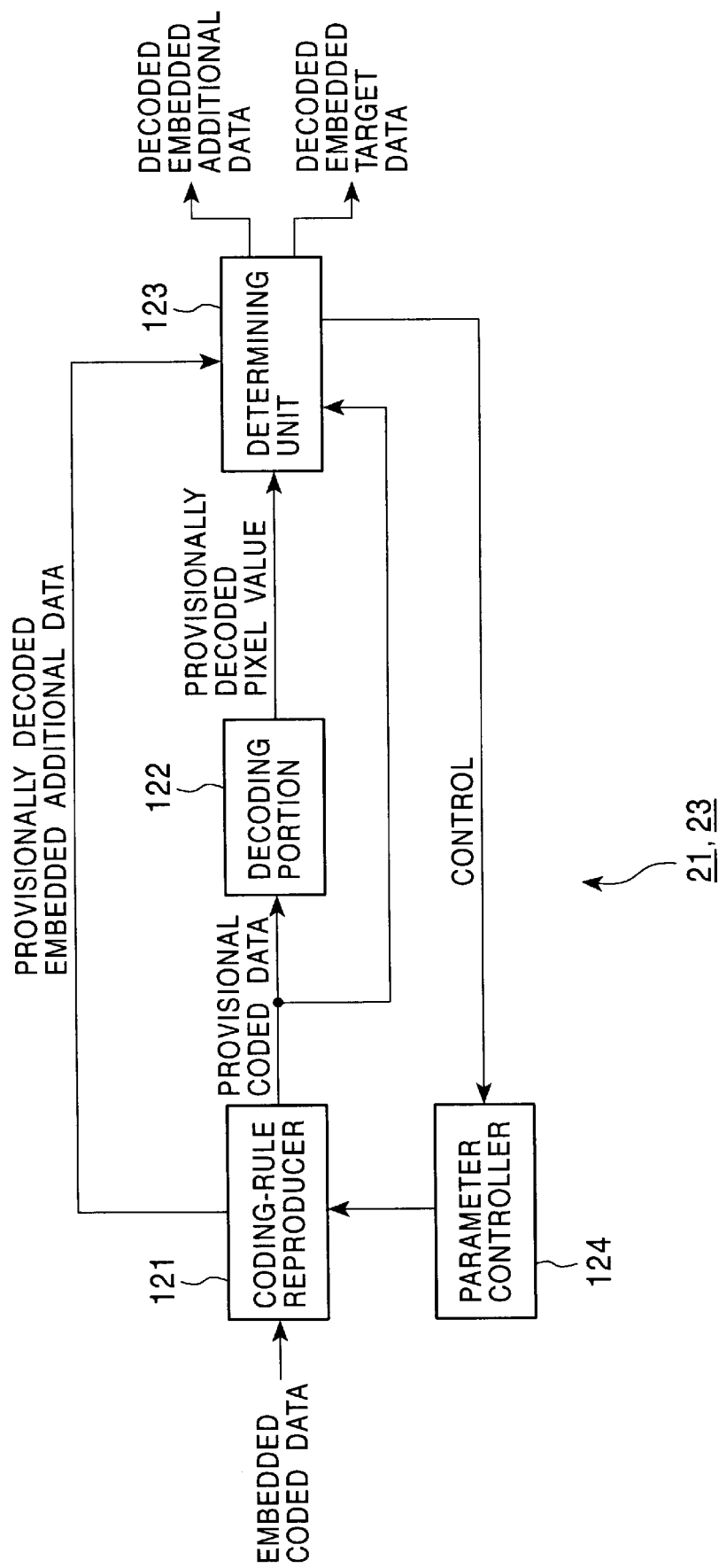
FIG. 24 is a block diagram illustrating a second example of the configuration of the decoder 21 (23)

FIG. 24 illustrates the configuration of the decoder 21 (decoder 23) shown in FIG. 4 when the integrator 11 (or embedding coder 13) in FIG. 2 is configured as shown in FIG. 20.

The embedded coded data output from the embedder 92 shown in FIG. 20 as the multiplexed data is supplied to a coding-rule reproducer 121.

The coding-rule reproducer 121 reproduces the true coded data which has been coded by the coding rule in the coder 91 shown in FIG. 20 from the embedded coded data, thereby obtaining the embedded additional data embedded in the coded data.

More specifically, the coding-rule reproducer 121 processes the embedded coded data based on a parameter supplied from the parameter controller 124 so as to determine the candidates of the true coded data (hereinafter referred to as "provisional coded data"). The coding-rule reproducer 121 also reproduces the candidates of the embedded additional data (hereinafter referred to as "provisionally decoded embedded additional data") embedded in the embedded coded data while reproducing the provisional coded data from the embedded coded data. Then, the provisional coded data is supplied to a decoding portion 122 and a determining unit 123, and the provisionally decoded embedded additional data is supplied to the determining unit 123.

The decoding portion 122 performs decoding processing on the provisional coded data supplied from the coding-rule reproducer 121 based on the coding rule employed in the coder 91 shown in FIG. 20, thereby obtaining the candidates of the original pixel values (hereinafter referred to as "provisionally decoded pixel values"). The provisionally decoded pixel values are supplied to the determining unit 123.

The determining unit 123 controls the parameter controller 124 to supply at least one parameter to the coding-rule reproducer 121 so as to obtain at least one provisionally decoded pixel value corresponding to the parameter, and then determines the faithfully decoded pixel value (which matches the original pixel value) from the provisionally decoded pixel value. The determining unit 123 also selects the faithfully decoded embedded additional data from at least one provisionally decoded embedded additional data accompanied with the provisionally decoded pixel value supplied from the coding-rule reproducer 121 in accordance with the faithfully decoded pixel value, and outputs the faithfully decoded pixel value and the faithfully decoded embedded additional data as the decoded embedded target data and the decoded embedded additional data, respectively.

The parameter controller 124 supplies the predetermined parameter for processing the embedded coded data to the coding-rule reproducer 121 under the control of the determining unit 123.

Figure 25:
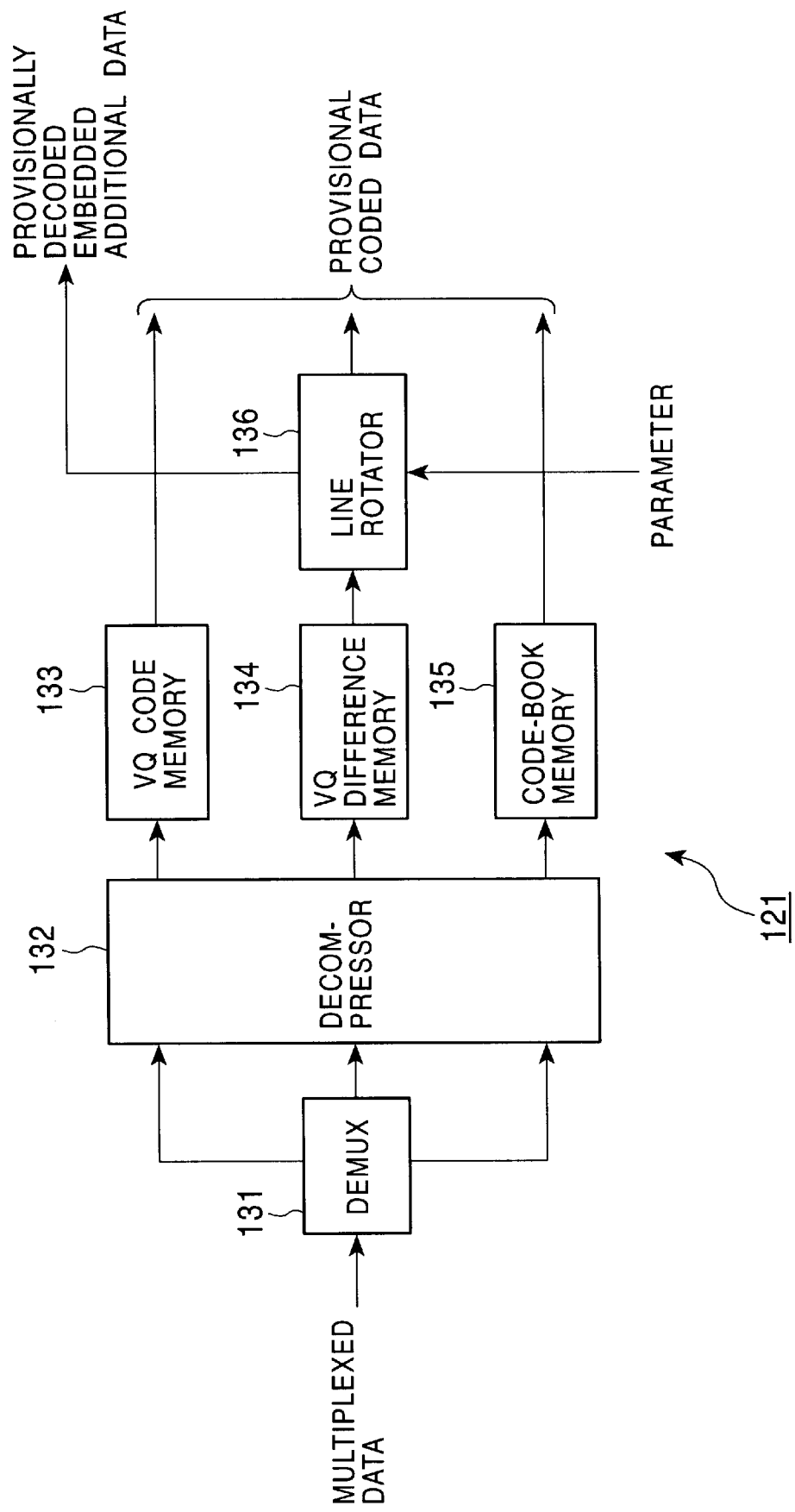
FIG. 25 is a block diagram illustrating the configuration of a coding-rule reproducer 121.

FIG. 25 illustrates the configuration of the coding-rule reproducer 121 shown in FIG. 24 when the embedder 92 in FIG. 20 is configured as shown in FIG. 22.

The embedded coded data output from the MUX 116 in FIG. 22 as the multiplexed data is supplied to a DEMUX 131. The DEMUX 131 separates the embedded coded data into the compressed VQ code, the VQ difference, and the code book, and supplies them to a decompressor 132. The decompressor 132 decompresses the VQ code, the VQ difference, and the code book supplied from the DEMUX 131, and supplies the decompressed VQ code, the VQ difference, and the code book to a VQ code memory 133, a VQ difference memory 134, and a code-book memory 135, respectively.

The VQ code memory 133, the VQ difference memory 134, and the code-book memory 135 store the VQ code, the VQ difference, and the code book, respectively, in units of frames.

A line rotator 136 sequentially selects the lines forming each frame of the image data stored in the VQ difference memory 134, for example, from the top to the bottom, and reads the VQ difference of the selected line from the VQ difference memory 134. It is now assumed that the number of pixels forming the selected line is x. The line rotator 136 receives integer values ranging from 0 to x from the parameter controller 124 (FIG. 24) as the parameter, and rotates the VQ difference of the selected line to the left by an amount equal to the number of pixels corresponding to the parameter. The line rotator 136 then outputs, together with the VQ code stored in the VQ code memory 133 and the code book stored in the code-book memory 135, the rotated VQ difference of each line as the provisional coded data.

The line rotator 136 then outputs the parameter value from the parameter controller 124 as the provisionally decoded embedded additional data.

Figure 26:
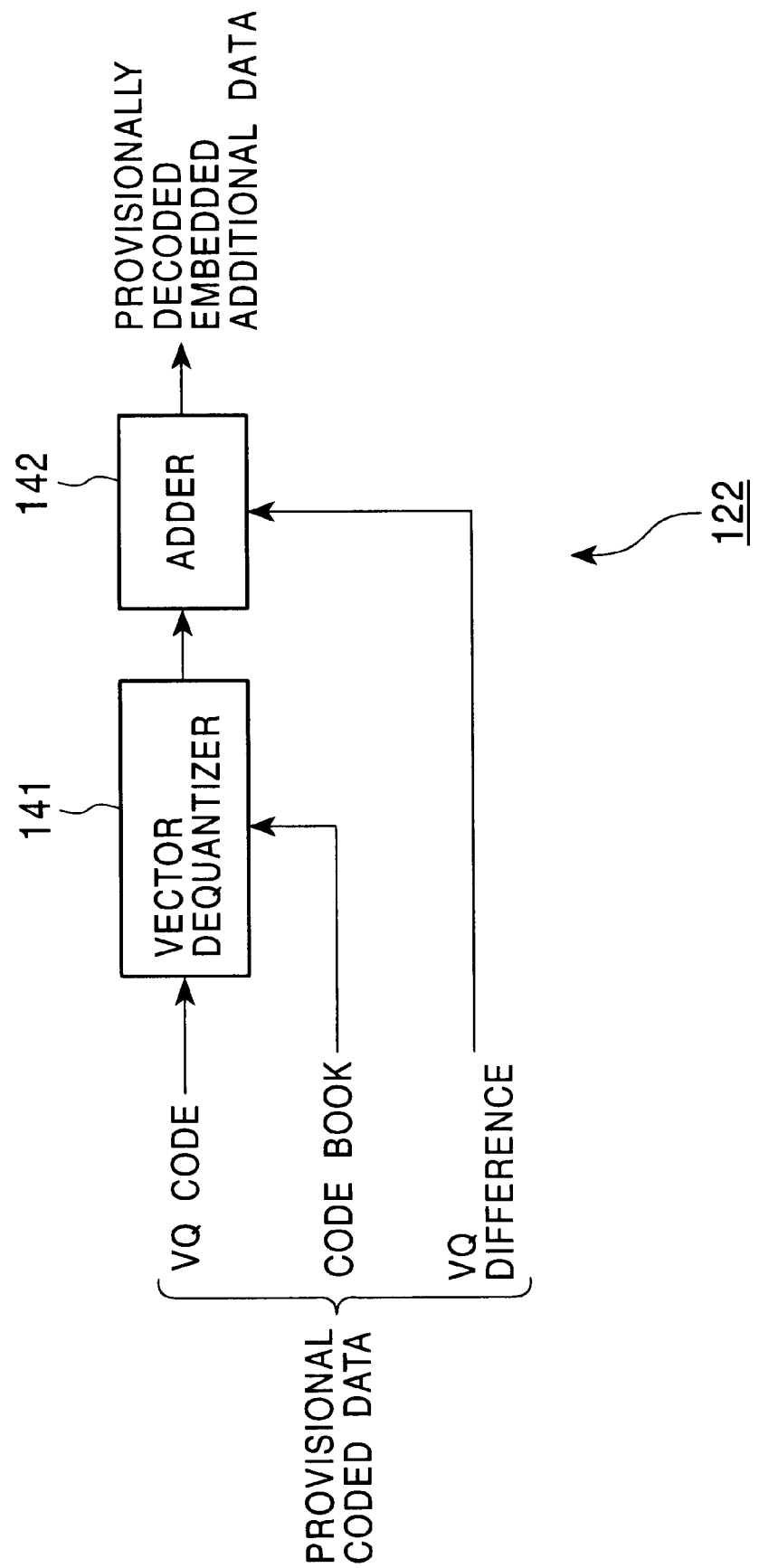
FIG. 26 is a block diagram illustrating the configuration of a decoding portion 122.

FIG. 26 illustrates the configuration of the decoding portion 122 shown in FIG. 24 when the coder 91 in FIG. 20 is configured as shown in FIG. 21.

The decoding portion 122 obtains the pixel values by performing vector dequantizing based on the VQ code, the VQ difference, and the book code of each frame as the coded data supplied from the coding-rule reproducer 121.

More specifically, the VQ code and the code book are supplied to a vector dequantizer 141, and the vector dequantizer 141 detects the centroid vector corresponding to the VQ code from the code book, and supplies the centroid vector to an adder 142. The adder 142 receives not only the centroid vector from the vector dequantizer 142, but also a difference vector as the VQ difference. The adder 142 adds the centroid vector and the difference vector so as to generate the vector components, and outputs the pixel values having the vector components as R, G, and B values as the provisionally decoded pixel values.

Figure 27:
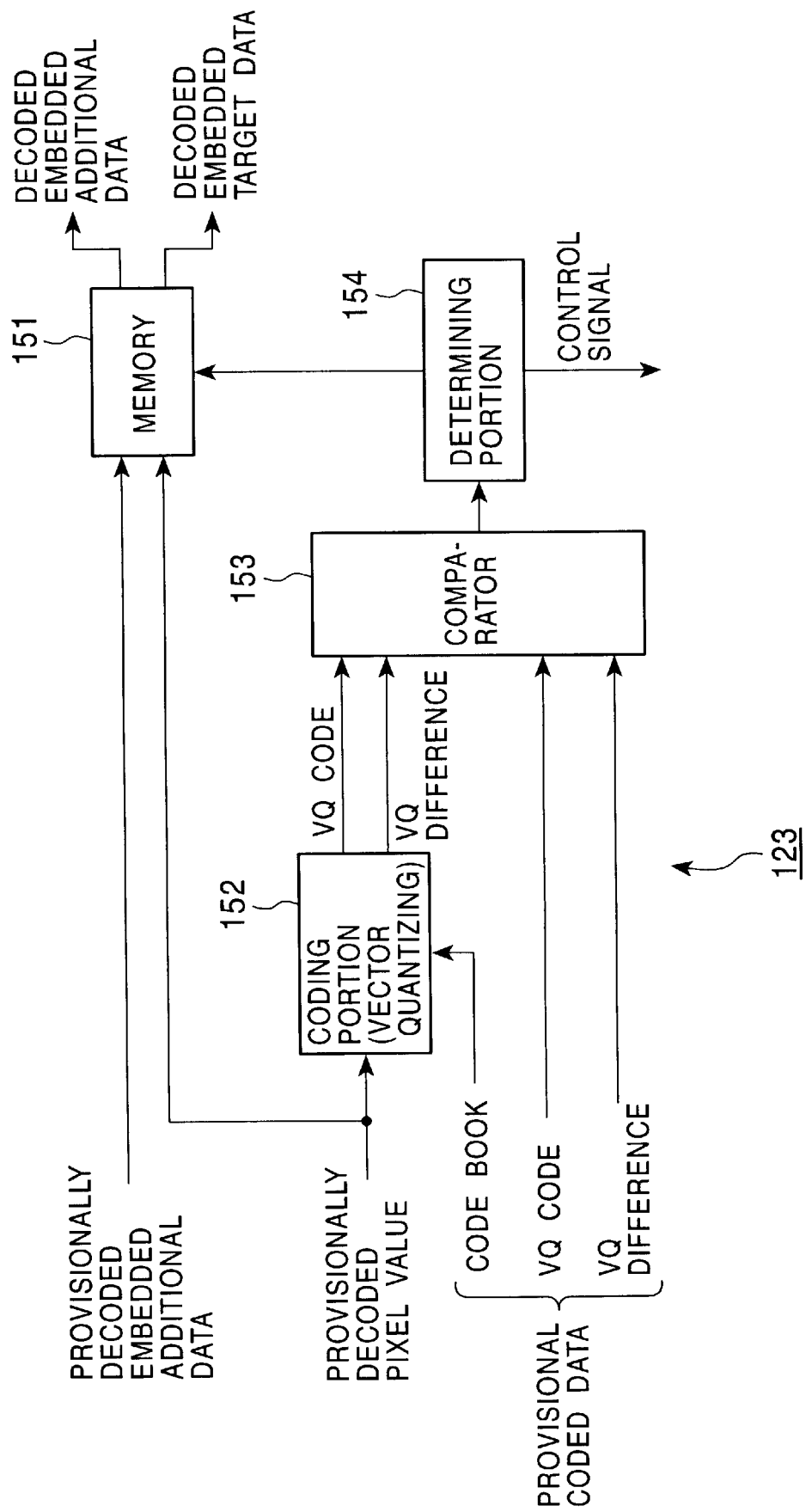
FIG. 27 is a block diagram illustrating the configuration of a determining unit 123.

FIG. 27 illustrates the configuration of the determining unit 123 shown in FIG. 24 when the coding-rule reproducer 121 and the decoding portion 122 are configured as shown in FIGS. 25 and 26, respectively.

A memory 151 receives the provisionally decoded embedded additional data from the coding-rule reproducer 121 and the provisionally decoded pixel values from the decoding portion 122. The memory 151 temporarily stores the provisionally decoded embedded additional data and the provisionally decoded pixel values, and also outputs the stored provisionally decoded embedded additional data and the stored provisionally decoded pixel values as the decoded embedded additional data and the decoded embedded target data under the control of a determining portion 154.

The code book of the provisional coded data from the coding-rule reproducer 121 and the provisionally decoded pixel values from the decoding portion 122 are supplied to a coding portion 152. The coding portion 152 then codes the provisionally decoded pixel values in a manner similar to the coder 91 shown in FIG. 20. That is, the coding portion 152 performs vector quantizing on the provisionally decoded pixel values by using the code book from the coding-rule reproducer 121, and outputs the resulting VQ code and the VQ difference to a comparator 153. The VQ code and the VQ difference obtained by vector-quantizing the provisionally decoded pixel values are referred to as the "provisional VQ code" and "provisional VQ difference", respectively.

The comparator 153 receives not only the provisional VQ code and the provisional VQ difference from the coding portion 152, but also the VQ code and the VQ difference from the decoding portion 122. The comparator 153 then compares the provisional VQ code with the VQ code of the provisional coded data, and also compares the provisional VQ difference with the VQ difference of the provisional coded data, and supplies the comparison results to the determining portion 154.

The determining portion 154 controls the parameter controller 124 to supply the number of bits for performing line rotation as the parameter to the coding-rule reproducer 121. The determining portion 154 also determines based on the comparison results from the comparator 153 whether the provisionally decoded pixel values are correct as the decoding result, and controls the reading of the provisionally decoded pixel values and the provisionally decoded embedded additional data from the memory 151 based on the determination result.

The principle of the determining processing performed by the determining portion 154 shown in FIG. 27 is discussed below with reference to FIG. 28.

In the coder 91 shown in FIG. 20, vector quantizing is performed in the RGB space, and thus, the centroid vector used in the vector quantizing processing is formed of three components, i.e., an R component, a G component, and a B component. It is now assumed that the centroid vector is indicated by (R, G, B), and, for simple representation, it is assumed that the R component, the G component, and the B component of the centroid vector in the code book are all represented by a multiple of 10. A pixel value having the R, G, and B components (102, 103, 99) (simply referred to as the "pixel value (102, 103, 99)") is considered as an example. The centroid vector positioned at the shortest distance from this pixel value (102, 103, 99) is the centroid vector (100, 100, 100). Thus, the pixel values (102, 103, 99) are vector-quantized into the VQ code corresponding to the centroid vector (100, 100, 100). The VQ code corresponding to the centroid vector (100, 100, 100) is set to, for example, 0.

In this case, the VQ difference is obtained by subtracting the centroid vector (100, 100, 100) from the pixel value (102, 103, 99), resulting in (2, 3, −1). Accordingly, the pixel value is coded into the VQ code 0 and the VQ difference (2, 3, −1).

Figure 28A:
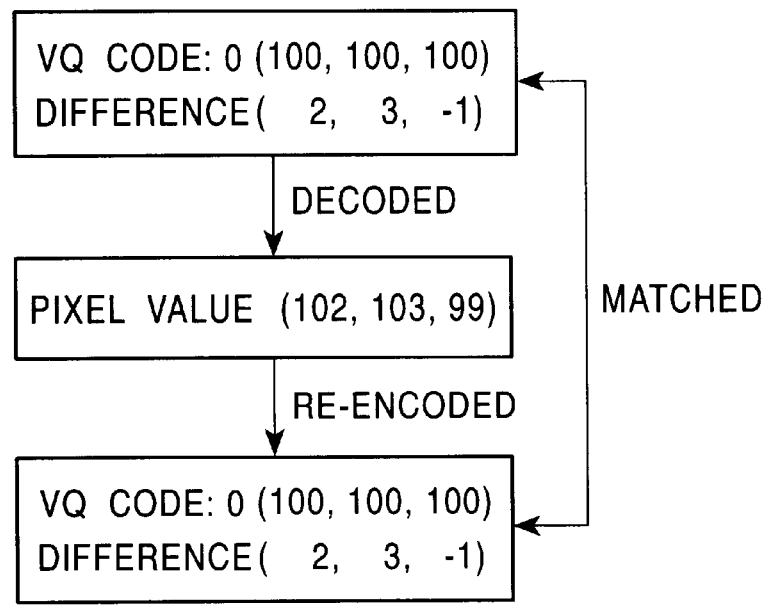
FIGS. 28A and 28B illustrate the processing performed by the determining unit 123.

Then, the VQ code 0 and the VQ difference (2, 3, −1) obtained in the coder 91 as the coded data are vector-dequantized. As shown in FIG. 28A, the centroid vector (100, 100, 100) corresponding to the VQ code 0 and the VQ difference (2, 3, −1) are added, and the pixel value (102, 103, 99) is obtained. Thus, the original pixel value is correctly reproduced.

The decoded pixel value (102, 103, 99) is re-vector-quantized, as shown in FIG. 28A, and the VQ code 0 and the VQ difference (2, 3, −1) are obtained.

As discussed above, the VQ code and the VQ difference are decoded into the correct original pixel value (decoding result). The decoding result is then re-coded (vector-quantized), and the resulting VQ code and the VQ difference coincide with the VQ code and the VQ difference, respectively, which serve as the coded data.

Figure 28B:
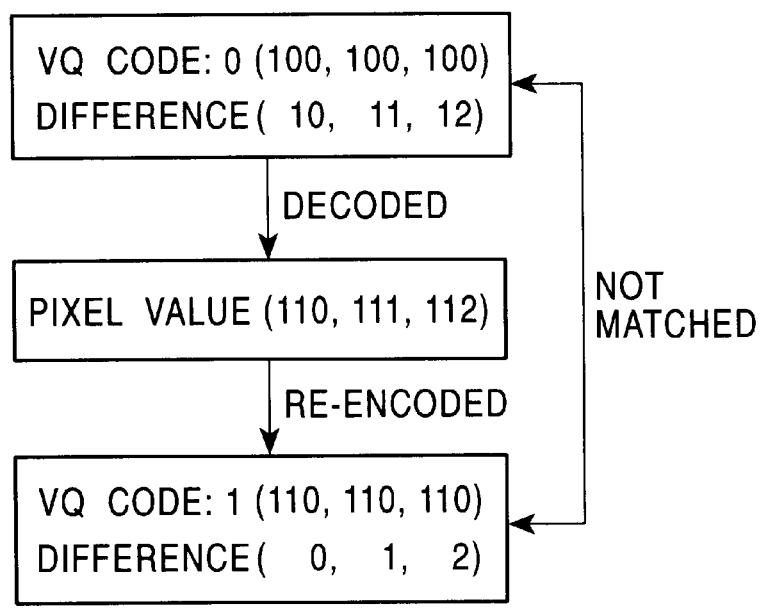

On the other hand, if embedding additional data is embedded by performing the above-described line rotation on the VQ difference (2, 3, −1), a VQ difference assigned to another pixel is re-assigned to the pixel having the VQ code 0 and the VQ difference (2, 3, −1). It is now assumed that the re-assigned VQ difference is (10, 11, 12). The VQ code 0 and the VQ difference (10, 11, 12) are decoded by adding the centroid vector (100, 100, 100) corresponding to the VQ code 0 and the VQ difference (10, 11, 12), as shown in FIG. 28B, resulting in the pixel value (110, 111, 112). This is different from the original pixel value (102, 103, 99).

Thus, when the incorrect pixel value (110, 111, 112) is re-vector-quantized, as shown in FIG. 28B, the resulting VQ code and the VQ difference do not coincide with the VQ code 0 and the VQ difference (2, 3, −1) as the coded data.

More specifically, since the R component, the G component, and the B component in the code book are all represented by a multiple of 10, the centroid vector positioned at the shortest distance from the pixel value (110, 111, 112) is (110, 110, 110). The VQ code indicating the centroid vector (110, 110, 110) is set to, for example, 1. Then, the pixel value (110, 111, 112) is vector-quantized into the VQ code 1 and the VQ difference (0, 1, 2) (=(110, 111, 112)−(110, 110, 110)). The VQ code 1 and the VQ difference (0, 1, 2) do not coincide with the VQ code 0 and the VQ difference (10, 11, 12), respectively, of the original coded data.

As described above, when the number of pixels to be rotated by the line rotator 136 shown in FIG. 25 by using the parameter does not coincide with the embedding additional data, i.e., when the provisional coded data does not coincide with the coded data before the embedding additional data is embedded, the VQ code and the VQ difference obtained by re-coding the provisionally decoded pixel value determined from such provisional coded data do not match the VQ code and the VQ difference, respectively, of the provisional coded data. Accordingly, it can be determined that the provisionally decoded pixel value obtained by decoding the provisional coded data is not correct.

Conversely, if the number of pixels to be rotated by the line rotator 136 shown in FIG. 25 by using the parameter coincides with the embedding additional data, i.e., when the provisional coded data coincides with the coded data before the embedding additional data is embedded, the VQ code and the VQ difference obtained by re-coding the provisionally decoded pixel value determined from the provisional coded data match the VQ code and the VQ difference, respectively, of the provisional coded data. Accordingly, it can be determined that the provisionally decoded pixel value obtained by decoding the provisional coded data is correct. When it is determined that the correct decoding result is obtained, the determining portion 154 shown in FIG. 27 controls the memory 151 to read the embedded additional data and the embedded target data corresponding to the correct decoding result from the memory 151.

Embedding Method Using Data Correlation

The embedding method using data correlation is discussed in detail below.

As the embedding method using data correlation, the following technique is, for example, employed. Embedding target data, for example, image data, is processed based on embedding additional data, thereby embedding the embedding additional data into the embedding target data. The resulting embedded data is then decoded into the embedded additional data and the embedded target data by utilizing correlation of the original image.

(1) Line Rotation

Figure 29:
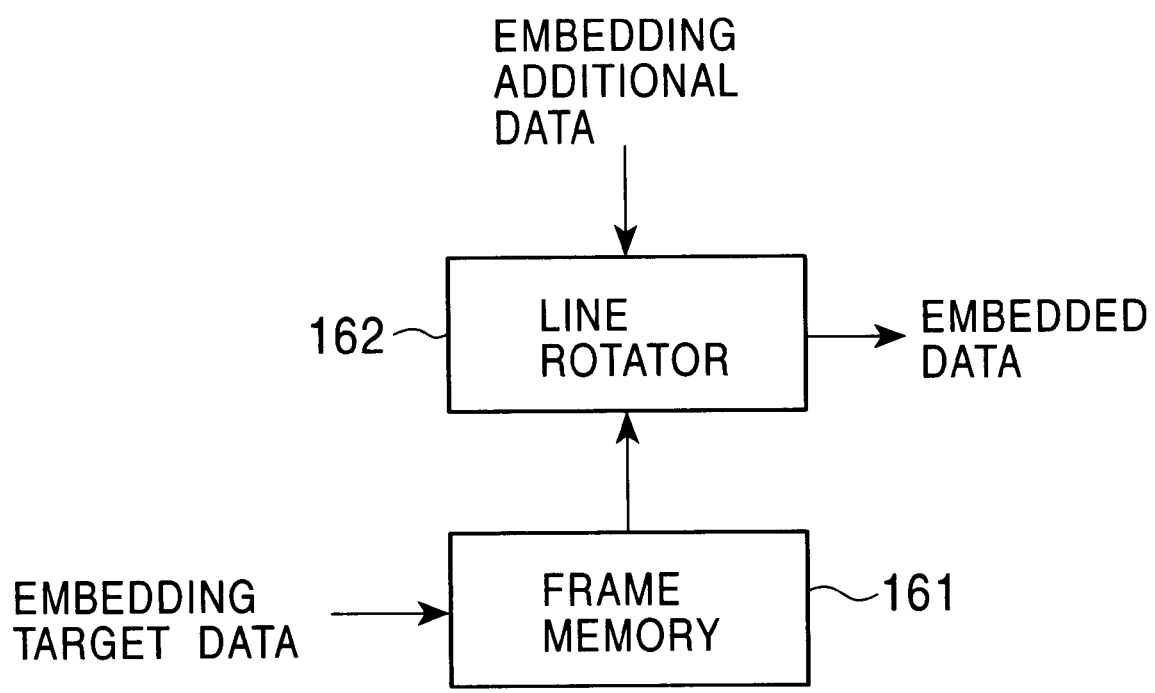
FIG. 29 is a block diagram illustrating a third example of the configuration of the integrator 11 (embedding coder 13)

FIG. 29 illustrates a first example of the integrator 11 (embedding coder 13) shown in FIG. 2 when the embedding method using data correlation is employed.

A frame memory 161 temporarily stores image data, which is the embedding target data, for example, in units of frames. The embedding additional data is supplied to a line rotator 162. The rotator 162 then horizontally shifts a predetermined line forming the image stored in the frame memory 161 by an amount equal to the embedding additional data, thereby embedding the embedding additional data into this line. The resulting embedded data is then output.

In the above-configured integrator 11, the image data, which is the embedding target data, is stored in the frame memory 161. The line rotator 162 reads the predetermined line forming the image stored in the frame memory 161, and determines whether the read line (hereinafter referred to as the "selected line") is the first line (the uppermost line of the frame). If so, the line rotator 162 outputs the first line as the embedded data without performing the rotating operation.

If the selected line is not the first line, i.e., if the selected line is the second or the subsequent line, the line rotator 162 receives the embedding additional data to be embedded into the selected line, and horizontally rotates the selected line by an amount equal to the number of pixels corresponding to the received embedding additional data.

Figure 30:
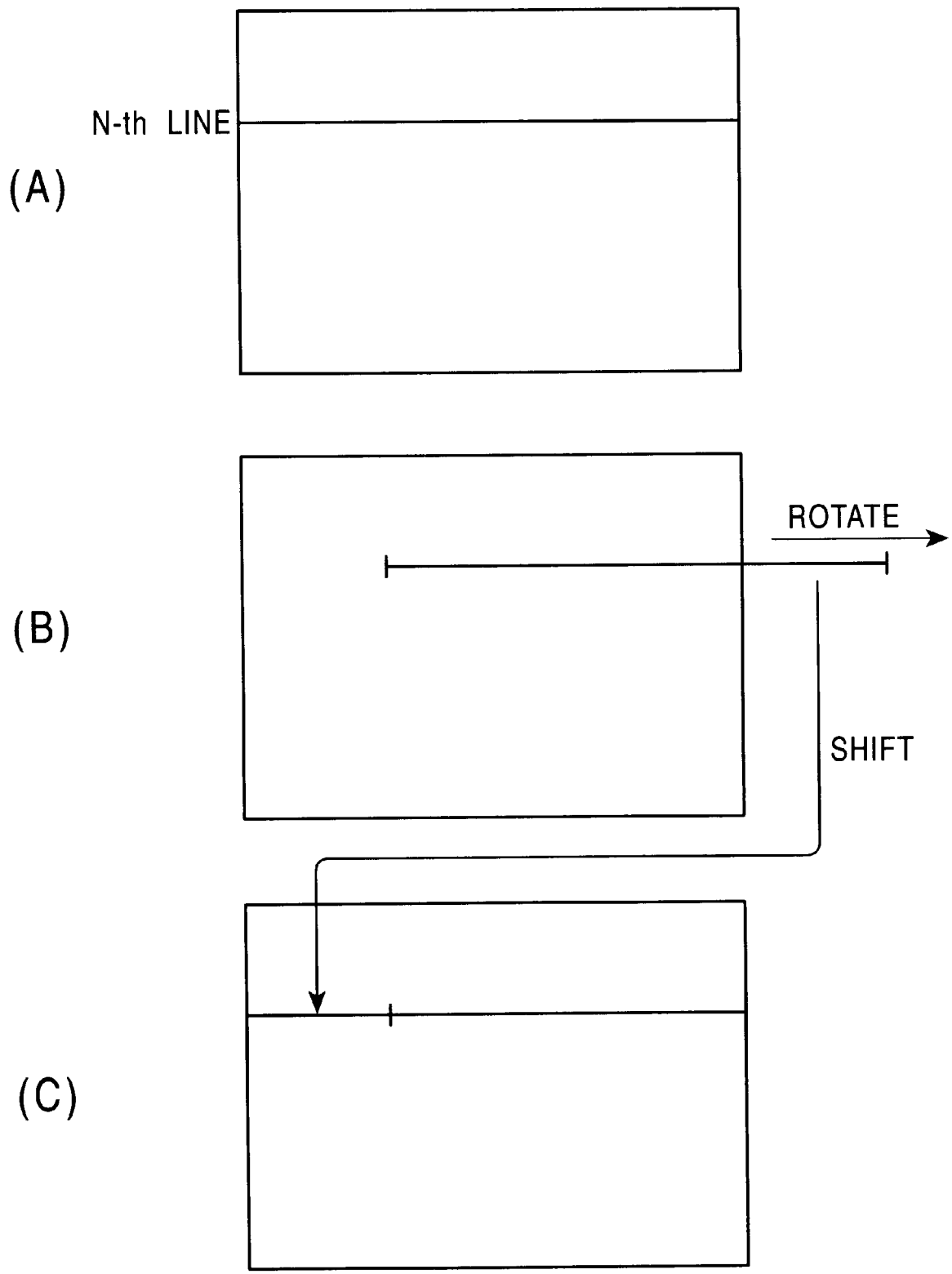
FIG. 30 illustrates the processing performed by a line rotator 162.

It is now assumed, as indicated in (A) of FIG. 30, that the selected line is the N-th line (N≠1). Then, the line rotator 162 rotates (shifts) the N-th line horizontally, for example, to the right, as indicated in (B) of FIG. 30, by an amount equal to the number of pixels of the embedding additional data. The line rotator 162 then shifts the portion of the N-th line extended from the frame to the right to the left side of the N-th line, as indicated in (B) of FIG. 30.

According to the above-described embed-coding method, a frame image is coded into the following embedded data.

Figure 31:
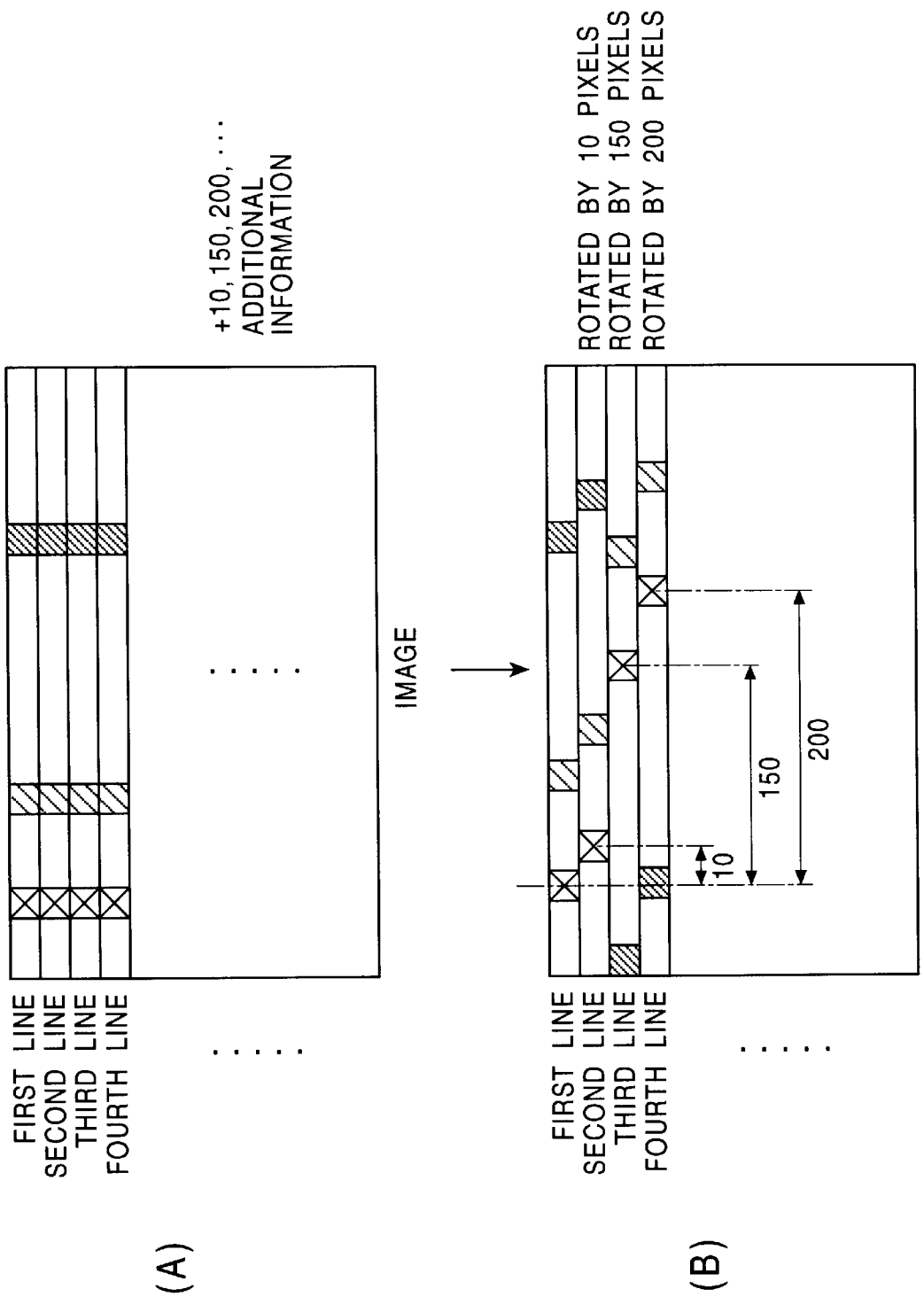
FIG. 31 illustrates the processing performed by the line rotator 162.

It is now assumed that 10, 150, 200, and so on, as additional information (referred to as the "first, second, and third embedding additional data"), is embedded into an image indicated in (A) of FIG. 31 (embedding target data). As indicated by (B) of FIG. 31, the first line is output as it is; the second line is rotated to the right by 10 pixels equal to the first embedding additional data; the third line is rotated to the right by 150 pixels equal to the second embedding additional data; and the fourth line is rotated to the right by 200 pixels equal to the third embedding additional data.

Similarly, the fifth and subsequent lines are rotated to the right by the number of pixels of the corresponding embedding additional data.

As discussed above, the additional data can be embedded by rotating the lines of the image stored in the frame memory 161 to the right by the number of pixels corresponding to the embedding additional data. In this case, by rotating the resulting lines in the opposite direction, the original image can be reproduced. The amount by which the corresponding line is rotated in the opposite direction can be determined to be the embedded additional data. Accordingly, the embedding additional data can be embedded without increasing the amount of data and with a minimum loss of the image quality.

That is, the rotated line in which the embedded additional data is embedded can be decoded into the original line and the embedded additional data without incurring an overhead by utilizing correlation of the image, i.e., the correlation between the rotated line and the original line. By re-rotating the line in the opposite direction, the original line and the embedded additional data can be reproduced. Basically, with this method, a decrease in the image quality caused by embedding the additional data cannot be found in the decoded image (reproduced image).

In this method, if there is no unrotated line in the embedded data, it is difficult to decode the rotated lines into the image (embedded target data) and the embedded additional data by utilizing correlation of the image. Thus, as discussed above, the embedding additional data is not embedded in the first line of each frame, i.e., the first line is not rotated, and is output as the embedded data.

Figure 32:
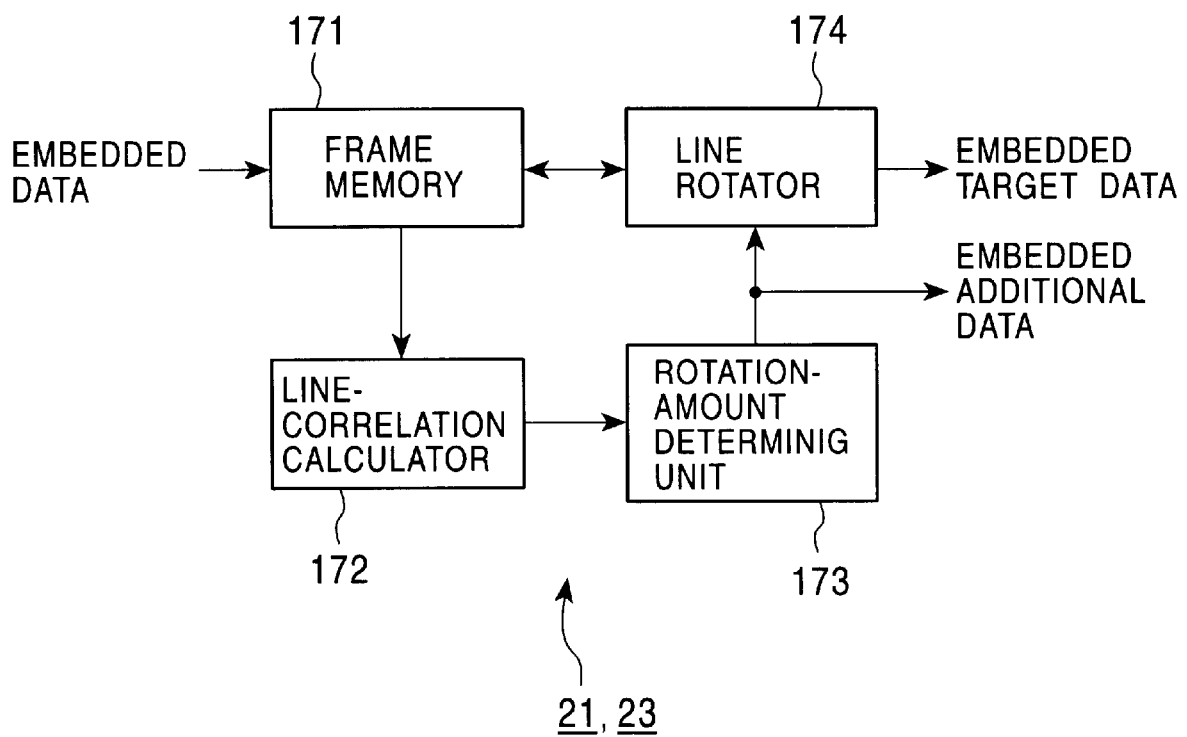
FIG. 32 is a block diagram illustrating a third example of the configuration of the decoder 21 (23)

FIG. 32 illustrates the configuration of the decoder 21 (or decoder 23) shown in FIG. 4 when the integrator 11 (or embedding coder 13) shown in FIG. 2 is configured as shown in FIG. 29.

A frame memory 171 temporarily stores the image data, which is the embedded data, as in the frame memory 161 shown in FIG. 29.

Figure 33A:
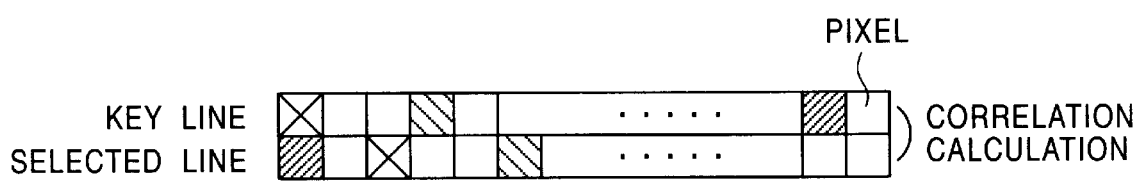
FIGS. 33A and 33B illustrate the processing performed by a line-correlation calculator 172.
Figure 33B:
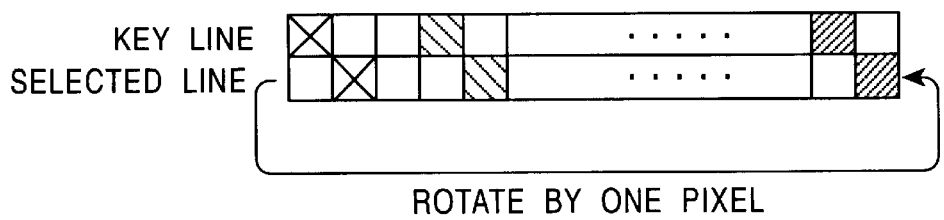

A line-correlation calculator 172 sequentially reads the lines of the image stored in the frame memory 171 starting from the first line, and while rotating the read line to the right or to the left, the line-correlation calculator 172 calculates the correlation value between the rotated line and the line positioned one above the rotated line. That is, as shown in FIG. 33A, the line-correlation calculator 172 reads the line to be decoded of the embedded data (image) stored in the frame memory 171 (such line is referred to as the "selected line") and the line positioned one above the selected line (which serves as a key to decoding the selected line, and is thus referred to as the "key line"), and calculates the correlation value between the selected line and the key line. The line-correlation calculator 172 then rotates the selected line by one pixel to the right or to the left (in this case, to the left, which is the opposite direction to the rotation discussed with reference to (B) of FIG. 30), and calculates the correlation value between the rotated selected line and the corresponding key line. Thereafter, similarly, the line-correlation calculator 172 calculates the correlation value between the selected line and the corresponding key line by rotating the selected line until the selected line returns to the original position.

As the correlation value between the selected line and the key line, the reciprocal of the sum of the absolute values of the differences between the pixels of the key line and the corresponding pixels of the selected line, or the reciprocal of the sum of the squares of the above-described differences may be used.

All the correlation values between the selected lines and the corresponding key lines determined by the line-correlation calculator 172 according to the amount by which the lines are rotated are supplied to a rotation-amount determining unit 173. The rotation-amount determining unit 173 detects the rotation amount of the selected line when the correlation between the selected line and the key line becomes maximum, and determines the rotation amount as the final rotation amount of the selected line (hereinafter referred to as the "determined rotation amount"). The determined rotation amount is output as the decoding result of the embedded additional data and is also supplied to a line rotator 174.

The line rotator 174 rotates the selected line stored in the frame memory 171 by the rotation amount supplied from the rotation-amount determining unit 173 to the left, as in the line-correlation calculator 172, and reads and outputs the rotated selected line as the decoding result of the selected line.

As discussed above, the embedded data in which the additional data is embedded is decoded into the original image and the embedded additional data by utilizing correlation of the image. Thus, the decoding operation can be performed without incurring an overhead, and basically, a decrease in the image quality caused by embedding the additional data cannot be found in the decoded image.

In the above-described example, the embedding additional data is embedded into the embedding target data by horizontally rotating the additional data. However, the additional data may be embedded by vertically rotating it.

(2) MSB Inversion

Figure 34:
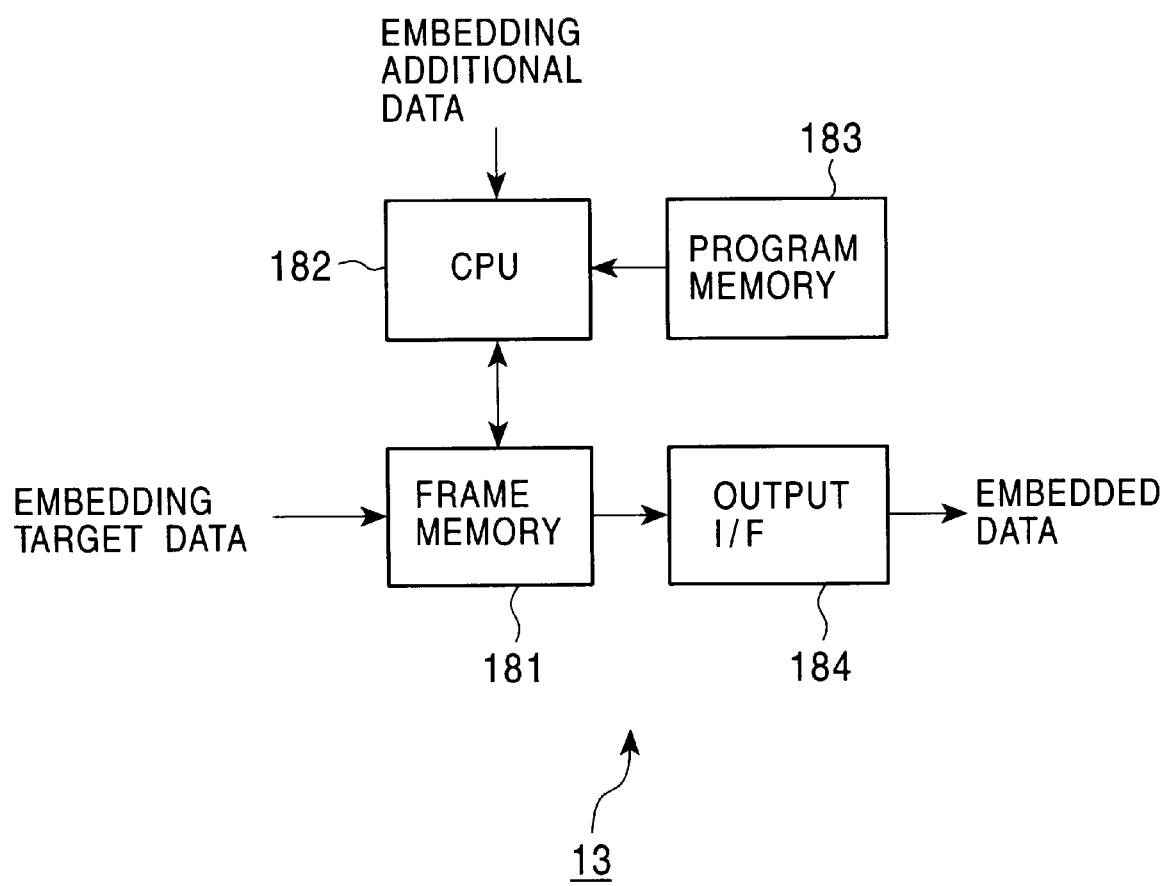
FIG. 34 is a block diagram illustrating a fourth example of the integrator 11 (embedding coder 13)

FIG. 34 illustrates a second example of the integrator 11 (embedding coder 31) shown in FIG. 2 when the embedding method using data correlation is employed.

Embedding target data, for example, image data, is supplied to a frame memory 181. The frame memory 181 temporarily stores the image data, for example, in units of frames.

A central processing unit (CPU) 182 performs embed-coding processing (which is discussed below) by executing a program stored in a program memory 183. That is, the CPU 182 receives the embedding additional data, for example, by the bit unit, and embeds the embedding additional data into the image stored in the frame memory 181. More specifically, the CPU 182 selects a predetermined pixel forming the image stored in the frame memory 181, and embeds the embedding additional data into the selected pixel such that the embedded additional data can be decoded into the original additional data by utilizing correlation of the image.

The program memory 183 is formed of, for example, a read only memory (ROM) or a random access memory (RAM), and stores the computer program for causing the CPU 182 to perform the embed-coding processing.

An output interface (I/F) 184 reads the image data (embedded target data) from the frame memory 181, and outputs it as the embedded data.

Figure 35:
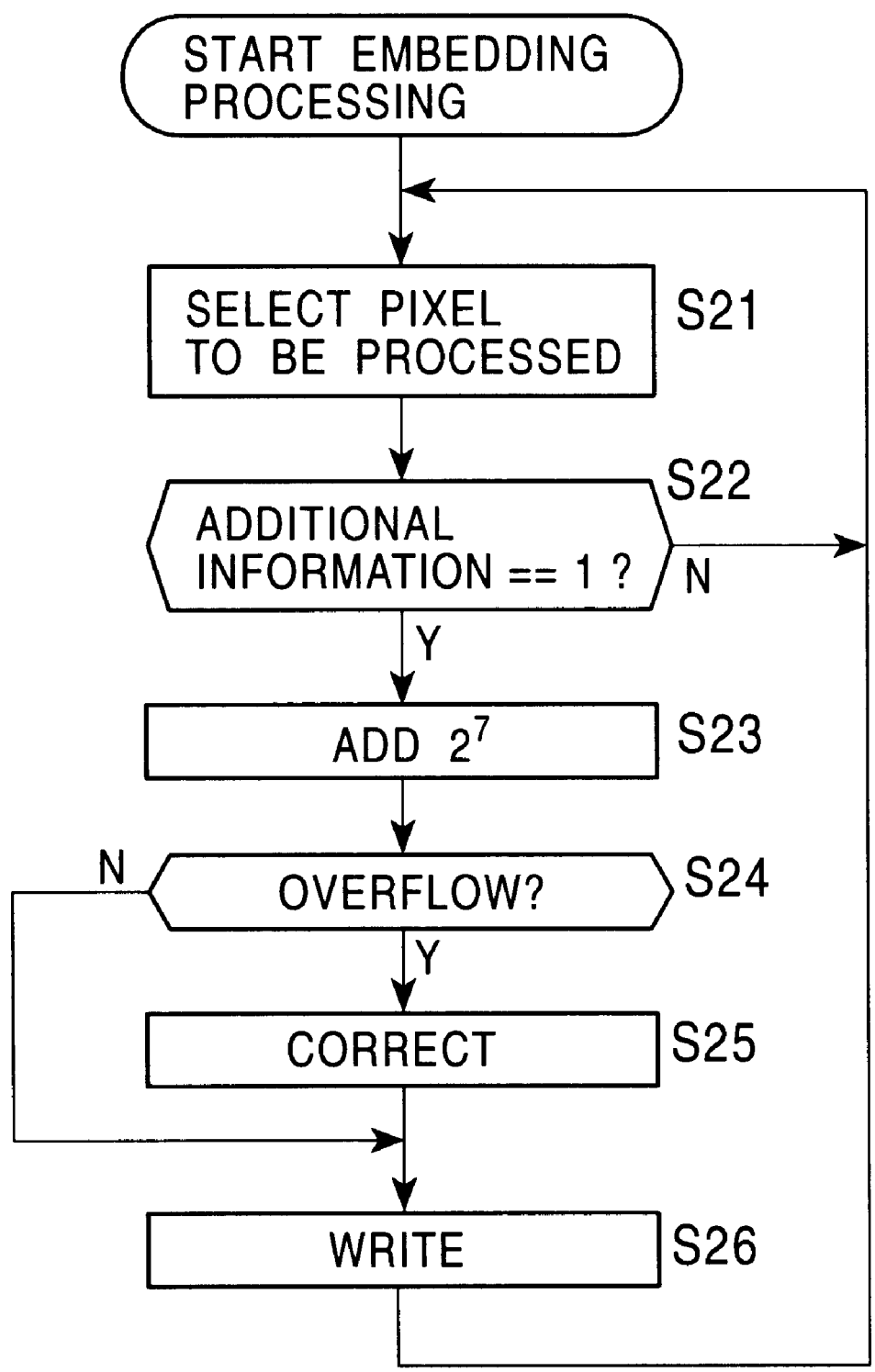
FIG. 35 is a flowchart illustrating the processing performed by a central processing unit (CPU) 182.

The embed-coding processing performed by the integrator 11 shown in FIG. 34 is described below with reference to the flowchart of FIG. 35.

In the frame memory 181, the embedding additional data is stored in units of frames.

The CPU 182 receives the embedding additional data by the bit unit. Upon receiving one bit of embedding additional data, in step S21, the CPU 182 selects the pixel into which the one-bit additional data is to be embedded (hereinafter referred to as the "selected pixel") from the pixels stored in the frame memory 181.

In this embodiment, the pixels are selected from the image stored in the frame memory 181 according to, for example, a checkerboard pattern, as shown in FIG. 36. That is, every time the processing in step S21 is performed, the CPU 182 sequentially selects the pixels without hatched portions in FIG. 36 in the order of, for example, raster scanning. In FIG. 36, p(x, y) indicates the x-th column (from the left) and y-th row (from the top) pixel.

Subsequently, the CPU 182 determines in step S22 whether the embedding additional data is 1 or 0. If it is found in step S22 that the embedding additional data is 0, the process returns to step S21. That is, if the embedding additional data is 0, the CPU 182 does not perform processing on the selected pixel (adds a predetermined constant 0), and returns to step S21. Then, upon receiving the subsequent one-bit embedding additional data, the subsequent pixel is selected, and processing is similarly repeated as described above.

If it is found in step S22 that the embedding additional data is 1, the process proceeds to step S23. In step S23, the CPU 182 performs predetermined processing on the selected pixel. That is, the CPU 182 adds the predetermined constant, for example, two to the power of N (N is the value obtained by subtracting one from the number of bits assigned to the selected pixel), to the selected pixel value.

Accordingly, if eight bits are assigned to the pixel value of the selected pixel, $2^7$ are added to the selected pixel value in step S23.

If the pixel value is formed of the luminance component Y, and the color components U and V, the above-described addition processing in step S23 may be performed on any one of the luminance component Y or the color components U and V. If the pixel value is formed of RGB, the addition processing in step S23 may be performed on any one of the R, G, and B components.

Adding $2^7$ to the 8-bit pixel value is to invert the most significant bit (MSB) of the pixel value.

After adding $2^7$ to the selected pixel value in step S23, the process proceeds to step S24 in which a determination is made as to whether the addition result causes overflow. If the outcome of step S24 is no, the process proceeds to step S26 by skipping step S25. In step S26, the CPU 182 writes the addition result (overwrites the previous value by the added value) in the frame memory 181 as the selected pixel value, and returns to step S21.

If it is found in step S24 that the addition result causes an overflow, i.e., that the addition result is $2^8$ or greater, the process proceeds to step S25 in which the added value is corrected. That is, in step S25, the added value causing an overflow is corrected to an amount equal to the value overflowed (i.e., to the value obtained by subtracting $2^8$ from overflow added value). In step S26, the CPU 182 writes the corrected addition result into the frame memory 181 as the selected pixel value, and returns to step S21.

Upon completion of the processing on the image for one frame stored in the frame memory 181, the output I/F 184 outputs the one frame image (in which the additional data is embedded in the embedding target data) as the embedded data. The CPU 182 continues processing on an image for a subsequent frame stored in the frame memory 181.

As discussed above, pixels forming an image stored in the frame memory 181 are selected one by one, and the additional data is embedded into the selected pixel such that the embedded data can be decoded into the original image and the additional data by using correlation of the image. According to this method, the additional data can be embedded without increasing the amount of data and with a minimum loss of the image quality.

That is, the pixels into which the additional data is embedded can be decoded into the original pixels (embedding target data) and the additional data without incurring an overhead by utilizing the correlation between the embedded pixels and unembedded pixels. Accordingly, basically, a decrease in the image quality caused by embedding the additional data cannot be found in the decoded image (reproduced image).

Figure 37:
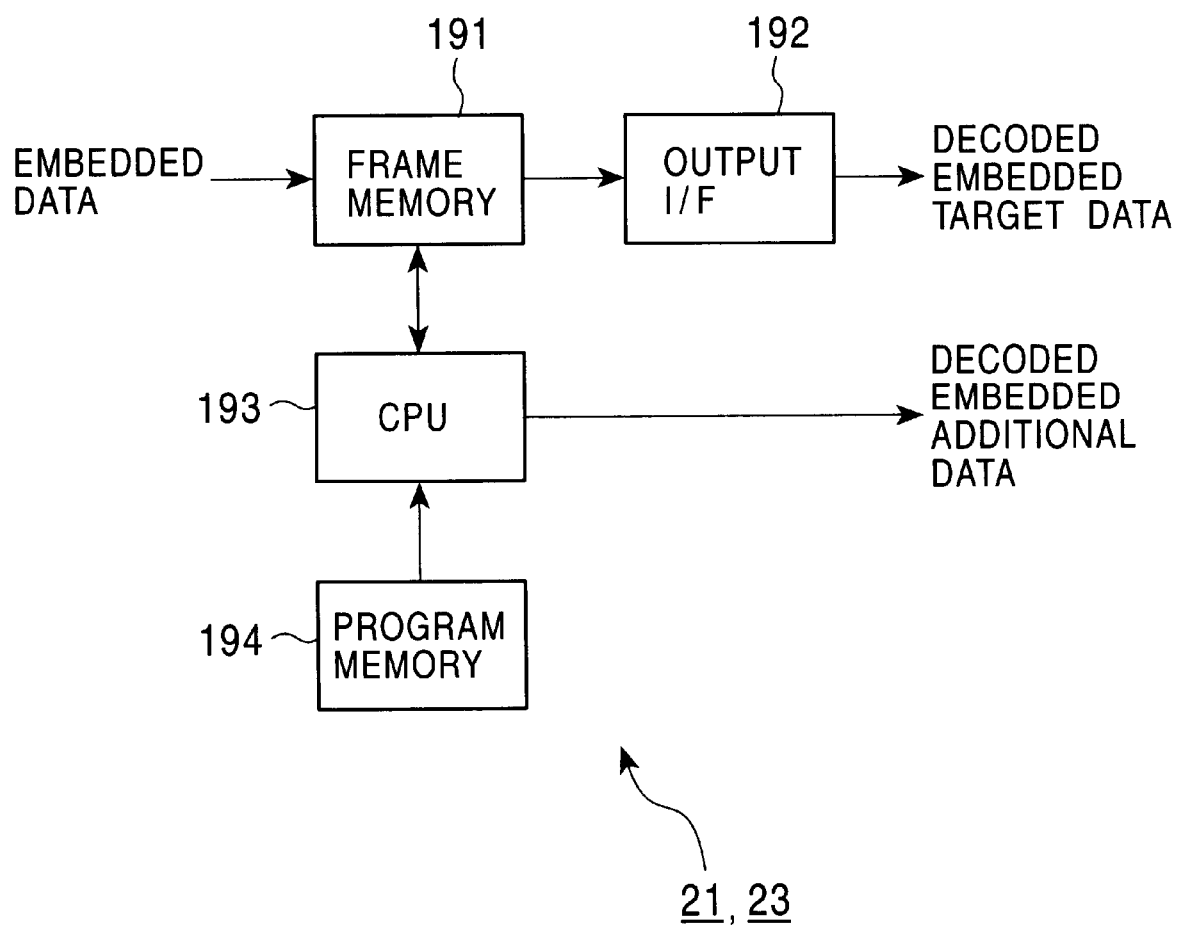
FIG. 37 is a block diagram illustrating a fourth example of the configuration of the decoder 21 (23)

FIG. 37 illustrates the configuration of the decoder 21 (or decoder 23) shown in FIG. 4 when the integrator 11 (or embedding coder 13) shown in FIG. 2 is configured as shown in FIG. 34.

Embedded data in which the additional data is embedded (hereinafter also referred to as "embedded image") is supplied to a frame memory 191, and the frame memory 191 temporarily stores the embedded image, for example, in units of frames.

An output I/F 192 reads and outputs the image (decoded image) obtained by the embed-decoding processing (discussed below) performed by a CPU 193.

Figure 38:
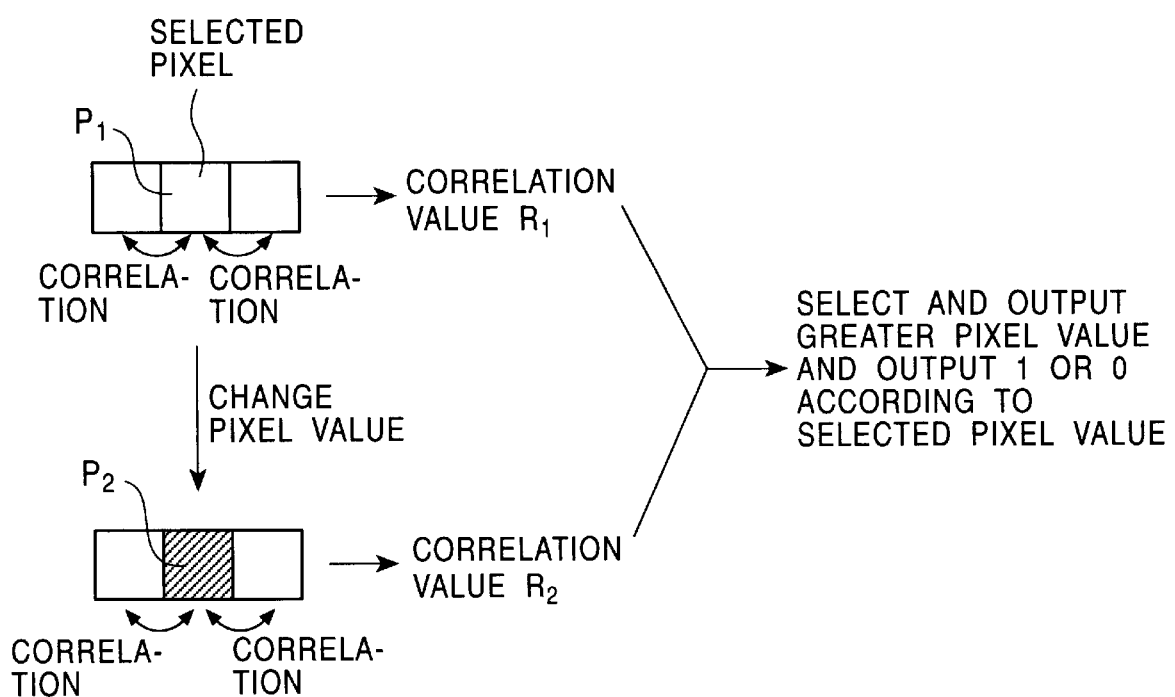
FIG. 38 illustrates the processing performed by a CPU 193.

The CPU 193 performs embed-decoding processing by executing a program stored in a program memory 194. That is, the CPU 193 decodes the embedded image stored in the frame memory 191 into the original image and the additional data by utilizing correlation of the image. More specifically, the CPU 193 selects a pixel forming the embedded image, and performs reverse processing, as shown in FIG. 38, to the processing performed by the CPU 182 shown in FIG. 34, thereby changing the selected pixel value. The CPU 193 then calculates a correlation value $R_1$ (first correlation) between the selected pixel before the pixel value is changed and peripheral pixels (which are horizontally adjacent to the selected pixel in FIG. 38), and also calculates a correlation value $R_2$ (second correlation) between the selected value after the pixel value is changed and the peripheral pixels. Then, the CPU 193 compares the correlation value $R_1$ with the correlation value $R_2$. Then, based on the comparison result, the CPU 193 selects one of the pixel values before being changed and after being changed and determines the selected value as the decoded value, and also reproduces the additional information embedded in the decoded image (in this embodiment, as 1 or 0).

The program memory 194 is constructed similarly to the program memory 183 shown in FIG. 34 and stores therein a computer program for enabling the CPU 193 to perform embed-decoding processing.

Figure 39:
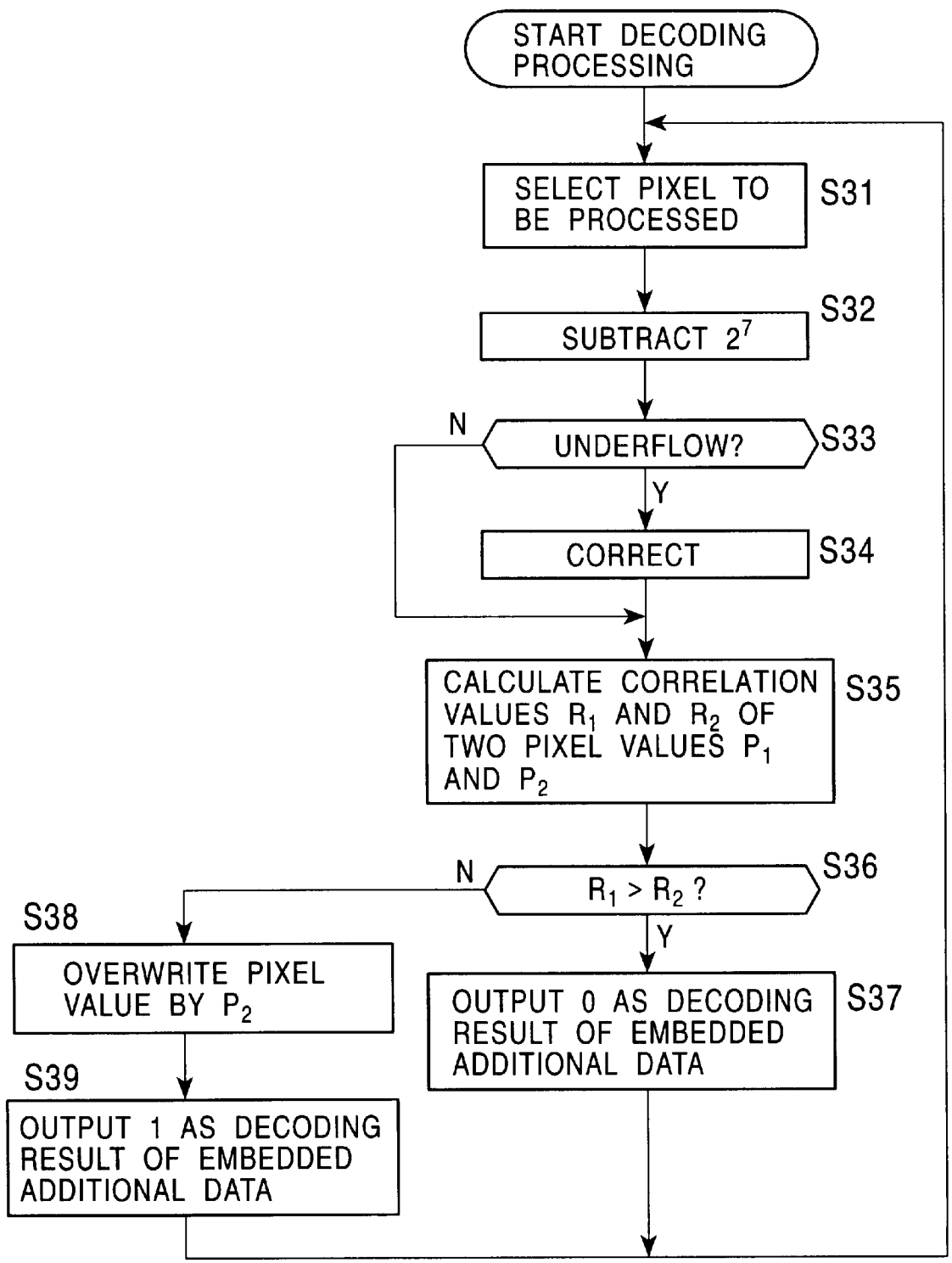
FIG. 39 is a flowchart illustrating the processing performed by the CPU 193.

The embed-decoding processing performed by the decoder 21 shown in FIG. 37 is discussed below with reference to the flowchart of FIG. 39.

Embed images are sequentially stored in units of frames in the frame memory 191. In step S31, the CPU 193 selects a pixel to be decoded from a certain frame of the embed image stored in the frame memory 191.

As in the case of the CPU 182 shown in FIG. 34, the CPU 193 alternately selects pixels from the embed image stored in the frame memory 191 according to a checkerboard pattern, as illustrated in FIG. 36. That is, every time the processing of step S31 is executed, the CPU 193 sequentially selects pixels without hatched portions in FIG. 36 one-by-one according to, for example, line scanning.

In step S32, the CPU 193 executes reverse processing, on the pixel to the processing performed by the CPU 182 shown in FIG. 34. That is, the CPU 193 subtracts a predetermined constant, i.e., two to the power of N (N is the value obtained by subtracting one from the number of bits assigned to the selected pixel of the image, from the selected pixel value. For example, if eight bits are assigned to the pixel value, as stated above, $2^7$ is subtracted from the selected pixel value in step S32. As in the addition processing in step S23 in FIG. 35, subtracting $2^7$ is to invert the MSB of the pixel value.

If the pixel value is represented by a luminance component Y, and color components U and V, the above-described subtraction processing may be made on any one of the components Y, U, and V. If the pixel value is indicated by components R, G, and B, the above-described subtraction processing may be performed on any one of the components R, G, and B. It is necessary, however, that the subtraction processing in step S32 should be made on the same type of component as that on which the addition processing in step S23 of FIG. 35 has been performed. More specifically, if the pixel value is represented by, for example, Y, U, and V, and the addition processing in step S23 of FIG. 35 has been performed on, for example, the Y component, the subtraction processing should also be made on the Y component in step S32.

After subtracting $2^7$ from the pixel value in step S32, the process proceeds to step S33 in which it is determined whether the subtracted value causes an underflow. If the outcome of step S33 is no, the process skips step S34 and proceeds to step S35.

On the other hand, if it is found in step S33 that the subtracted value causes an underflow, i.e., the subtracted value is less than zero, the process proceeds to step S34 in which the subtracted value is corrected. That is, in step S34, the underflowed subtracted value is corrected to, for example, the value obtained by adding $2^8$ to the subtracted value. The process then proceeds to step S35.

In step S35, the CPU 193 calculates a correlation value $R_1$ between the pixel value $P_1$ (the value from which $2^7$ is not subtracted in step S32, hereinafter referred to as the "first pixel value") and peripheral pixels, for example, pixels horizontally adjacent to the pixel $P_1$. The CPU 193 also calculates a correlation value $R_2$ between the subtracted pixel value $P_2$ (including the pixel values corrected in step S34, hereinafter referred to as the "second pixel value") and peripheral pixels, for example, pixels horizontally adjacent to the pixel $P_2$.

More specifically, in step S35, an absolute value of the difference between the first pixel value $P_1$ and each of the adjacent pixel values is calculated, and the two absolute values are added. The resulting value is then determined to be the correlation value $R_1$ with respect to the first pixel value $P_1$. In step S35, an absolute value of the difference between the second pixel value $P_2$ and each of the adjacent pixel values is also calculated, and the two absolute values are added. The resulting value is then determined to be the correlation value $R_2$ with respect to the second pixel value $P_2$.

In step S35, the pixels used for obtaining the correlation values $R_1$ and $R_2$ are not restricted to the pixels horizontally adjacent to the pixel $P_1$ or $P_2$, and may be pixels vertically adjacent to the pixel $P_1$ or $P_2$ or may be pixels temporally adjacent to the pixel $P_1$ or $P_2$. It is not necessary that the pixels for obtaining the correlation values $R_1$ and $R_2$ be spatially or temporally adjacent. Yet, it is desirable that the pixels indicated by hatched portions in FIG. 36, i.e., the pixels without embedded additional information, be used for determining the correlation values $R_1$ and $R_2$ with respect to the pixels $P_1$ and $P_2$, respectively. The reason for this is as follows. Even if the correlation value between the pixel $P_1$ or $P_2$ and the pixels having additional information therein is obtained, the correlation of the pixel $P_1$ or $P_2$ to the original image cannot be acquired. Accordingly, the principle of the correlation of the image cannot be utilized. It is thus difficult to correctly reproduce the original pixel values and the additional information from the pixels having the embedded additional information therein. Additionally, since the pixel $P_1$ or $P_2$ is decoded by utilizing the correlation of the image, it is preferable that the pixels used for obtaining the correlation values $R_1$ and $R_2$ be positioned spatially or temporally adjacent to the pixel $P_1$ or $P_2$.

Then, after calculating the correlation values $R_1$ and $R_2$, the process proceeds to step S36 in which the CPU 193 compares the correlation values $R_1$ and $R_2$.

If it is determined in step S36 that the correlation value $R_1$ is greater than the correlation value $R_2$, the process proceeds to step S37. In step S37, the CPU 193 outputs 0 as the decoded additional information, and returns to step S31. In this case, the value stored in the frame memory 191 is not overwritten, and thus, the selected pixel value remains the same as the pixel value $P_1$.

More specifically, it has been determined in step S36 that the correlation value $R_1$ concerning the first pixel value $P_1$ is greater than the correlation value $R_2$ concerning the second pixel value $P_2$. It is thus demonstrated that the selected pixel may be more precisely represented by the pixel value $P_1$ than the pixel value $P_2$, and the pixel value $P_1$ is then determined to be the decoded pixel value. Since $2^7$ is not subtracted from the pixel value $P_1$ in step S32, it can be considered that $2^7$ has not been added in step S23 of FIG. 35. In the embed-coding processing shown in FIG. 35, it is determined that $2^7$ are not added when the additional information indicates 0. Thus, if the correlation value $R_1$ concerning the first pixel value $P_1$ is greater than the correlation value $R_2$ concerning the second pixel value $P_2$, and if it is likely that the pixel value $P_1$ rather than the pixel value $P_2$ is determined to be the pixel value to be decoded, the additional information embedded in the corresponding pixel is 0.

If it is determined in step S36 that the correlation value $R_2$ is greater than or equal to the correlation value $R_1$, the process proceeds to step S38. In step S38, the CPU 193 overwrites the pixel value stored in the frame memory 191 by the value obtained by subtracting $2^7$ from the pixel value, i.e., by the second pixel value $P_2$. In this case, therefore, the pixel value $P_2$ is determined to be the decoded pixel value. The process then proceeds to step S39 in which the CPU 193 outputs 1 as the decoded additional information. The process then returns to step S31.

More specifically, if it has been determined in step S36 that the correlation value $R_2$ concerning the second pixel value $P_2$ is greater than or equal to the correlation value $R_1$ concerning the first pixel value $P_1$, the pixel to be decoded can be represented more precisely by the pixel value $P_2$ than the pixel value $P_1$. Accordingly, the pixel value $P_2$ is determined to be the decoded pixel value. Since $2^7$ are subtracted from the pixel value $P_2$ in step S32, it can be considered that $2^7$ have been added in step S23 of FIG. 35. In the embed-coding processing shown in FIG. 35, it is determined that $2^7$ are added when the additional information indicates 1. Thus, if the correlation value $R_2$ concerning the second pixel value $P_2$ is greater than or equal to the correlation value $R_1$ concerning the first pixel value $P_1$, and if it is likely that the pixel value $P_2$ is determined to be the pixel value to be decoded, the additional information embedded in the corresponding pixel is 1.

If the difference between the correlation values $R_1$ and $R_2$ obtained as described above is small, it is not possible to unambiguously determine which correlation value $R_1$ or $R_2$ can be used more precisely as the pixel value to be decoded. Accordingly, in this case, not only horizontally adjacent pixels, but also other pixels, may be used for obtaining the correlation values $R_1$ and $R_2$ with respect to the pixel values $P_1$ and $P_2$, respectively. The correlation values $R_1$ and $R_2$ may be then compared, thereby determining which correlation value $R_1$ or $R_2$ can be more precisely used as the decoded pixel.

According to the foregoing description, the embedded data representing an image having embedded additional information therein is decoded into the original image and into the additional information by utilizing the correlation of the image, thereby achieving the decoding operation without causing an overhead. Accordingly, the decoded image (reproduced image) is basically free from a decrease in the image quality caused by embedding the additional information into the original image.

Although in this embodiment an absolute value of the difference between the selected pixel and another pixel is used as a correlation value between these pixels, the correlation value is not limited to the absolute value obtained as described above.

In this embodiment, pixels are alternately selected from the image according to a checkerboard pattern, as shown in FIG. 36, and additional information is embedded in the selected pixels. However, the pixels may be selected in a pattern different from the above. As stated above, however, in decoding the pixels having the embedded additional information therein, pixels without embedded additional information are desirably selected for obtaining the correlation. The correlation between the pixels becomes smaller as the pixels are spatially or temporally farther away from each other. Accordingly, with a view to achieving precise decoding, the pixels in which additional information are to be embedded should be spatially or temporally selected sparsely. On the other hand, for the purpose of embedding a greater amount of additional information, i.e., for the increased compression ratio, the number of pixels to be selected should be increased to some degree in order to embed the additional information therein. Thus, it is desirable that the pixels for embedding additional information be selected while considering the tradeoffs between precise decoding and a considerably high compression ratio.

In this embodiment, one-bit additional information is embedded in one selected pixel. However, additional information having two bits or greater may be embedded in one pixel. If, for example, two-bit additional information, is embedded in one pixel, one of 0, $2^6$, $2^7$, and $2^6+2^7$ may be added to the pixel value according to the two-bit additional information.

In the foregoing embodiment, the additional information is embedded by adding 0 or $2^7$ to the pixel value (in other words, by adding $2^7$ or not adding $2^7$). The value to be added to the pixel value is not limited to $2^7$. If, however, a value which may produce an influence on only the lower bits of the pixel value is added, the resulting added pixel value does not become substantially different from the original pixel value. Accordingly, no substantial difference is observed between the correlation values $R_1$ and $R_2$ obtained in step S35 of FIG. 39. This decreases the precision of the decoded pixel and the decoded additional information. It is therefore desirable that the value to be added to the pixel value according to the additional information be a value which may produce an influence on the upper bits of the original pixel value.

According to the foregoing embodiment, the additional information is embedded by adding a predetermined value to the pixel value. However, the additional information may be embedded by performing an operation on the pixel value other than the addition processing (for example, bit inversion). As discussed above, however, with a view to maintaining the quality of the decoded pixel value and the decoded additional information, the operation should be determined so that a significant difference can be produced between the correlation value concerning the original pixel value and the correlation value concerning the pixel value obtained after performing the corresponding embedding operation.

In the integrator 11 shown in FIG. 2, advertisement data is embedded into media data. However, data to be embedded into the media data is not restricted to advertisement data.

Also, in the integrator 11 shown in FIG. 2, media data and advertisement data are coded by embedding the advertisement data into the media data. However, the method for coding the media data and the advertisement data is not restricted to embedding. If the coding method employed in the integrator 11 shown in FIG. 2 is not restricted, embedding without using data correlation should be performed in the embedding coder 13 shown in FIG. 2. More specifically, in order to perform embedding using data correlation in the embedding coder 13, the intermediate coded data output from the integrator 11 must have some correlation. Accordingly, if the coding method in the integrator 11 is not specified, the intermediate coded data output from the integrator 11 may not have correlation. It is thus necessary to employ the embedding method without utilizing correlation in the embedding coder 13.

As the coding processing in which the resulting intermediate coded data does not have correlation, scrambling used in CATV or satellite broadcasting may be employed. With the scrambling method, the media data and the advertisement data can be scrambled in the integrator 11. In this case, the decoder 22 must perform descrambling processing, and the decoding presentation program for performing descrambling is embedded into the intermediate coded data by the embedding coder 13 according to an embedding method without utilizing correlation.

Conversely, if an embedding method using correlation is employed in the embedding coder 13, the integrator 11 must perform coding so that the resulting intermediate coded data is provided with some correlation.

As the coding processing in which the resulting intermediate coded data having correlation, the above-described rotation embedding processing may be employed. If, for example, horizontal rotation is performed in the integrator 11, embedding using correlation can be performed in the embedding coder 13 by performing vertical rotation or adding a predetermined value.

The above-described series of processing may be performed by hardware or software. If software is used, a corresponding software program is installed into a general-purpose computer.

FIG. 40 is a block diagram illustrating the configuration of a computer into which the program for executing the above-described series of processing is to be installed.

The program may be recorded in a hard disk 205 or a ROM 203, which serves as a recording medium integrated into the computer.

Alternatively, the program may be permanently or temporarily stored (recorded) in a removable recording medium 211, such as a floppy disk, a compact disc read only memory (CD-ROM), a magneto-optical (MO) disk, a digital versatile disc (DVD), a magnetic disk, or a semiconductor disk. The removable recording medium 211 can be provided as so-called package software.

Instead of installing the program into the computer via the removable recoding medium 211, the program may be wirelessly transferred to the computer from a download site via a digital broadcasting satellite or by cable via a network, such as a local area network (LAN) or the Internet. The program is then received by a communication unit 208 of the computer, and is installed in the built-in hard disk 205.

The computer has a built-in CPU 202. An input/output interface 210 is connected to the CPU 202 via a bus 201. In response to a command input via the input/output interface 210 from a user by operating an input unit 207, such as a keyboard, a mouse, a microphone, etc., the CPU 202 executes a program stored in the ROM 203. The CPU 202 also loads the following types of programs into a RAM 204 and executes them: a program stored in the hard disk 205; a program received by the communication unit 208 from a satellite or a network and installed in the hard disk 205; and a program read from the removable recording medium 211 fixed on a drive 209 and installed into the hard disk 205. The CPU 202 then performs processing indicated in the above-described flowcharts or processing performed by the blocks in the above-described diagrams. Then, if necessary, the CPU 202 outputs a processing result from an output unit 206, such as a liquid crystal display (LCD) device or a speaker, or transmits the processing result from the communication unit 208 via the input/output interface 210, or records the processing result on the hard disk 205.

It is not essential that the steps forming the program for causing the computer to perform the above-described processing be executed chronologically according to the order discussed in this specification. Alternatively, they may be executed concurrently or individually, or they may be executed according to object processing.

The program may be processed by a single computer, or distribution processing may be performed on the program by using a plurality of computers. Alternatively, the program may be transferred to a remote computer and executed therein.

In the foregoing embodiment, in the coding device 1 (FIG. 2), the program for decoding and presenting the media data and the advertisement data is embedded in the intermediate coded data. Other programs, such as information specifying the decoding method for decoding the intermediate coded data into the original media data and the advertisement data, may also be embedded into the intermediate coded data.

It is not essential that the same embedding method for embedding the advertisement data into the media data be employed. Alternatively, the embedding method may be changed in predetermined units of the media data. In this case, information indicating the types of embedding methods for the individual units of the media data can be embedded into the intermediate coded data.

What is claimed is:

1. A data processing apparatus for coding data, comprising:
   coding means for generating third data by coding first data and second data;
   decoding-information generating means for generating decoding information, the third data being decoded into the first data and the second data based on the decoding information; and
   embed-coding means for embedding the decoding information generated by said decoding-information generating means into the third data, thereby generating embedded data.

2. A data processing apparatus according to claim 1, wherein said coding means generates the third data by embedding the second data into the first data, and supplies an embedding-format signal indicating a predetermined embedding format to said decoding-information generating means.

3. A data processing apparatus according to claim 2, wherein said decoding-information generating means generates the decoding information, which is used for decoding the third data into the first data and the second data, based on the embedding-format signal supplied from said coding means.

4. A data processing apparatus according to claim 3, wherein said decoding-information generating means generates the decoding information as a program for decoding the third data into the first data and the second data, the program being executed on a computer.

5. A data processing apparatus according to claim 2, wherein said coding means generates the third data by embedding the second data into the first data according to embedding methods which are different among predetermined units.

6. A data processing apparatus according to claim 2, wherein said coding means embeds the second data into the first data so that the third data is decoded into the first data and the second data based on correlation of the first data.

7. A data processing apparatus according to claim 2, wherein said coding means generates coded data by coding the first data, and generates the third data by modifying part of the coded data based on the second data, thereby embedding the second data into the first data.

8. A data processing apparatus according to claim 7, wherein said coding means comprises: coding-table generating means for generating a coding table for statistically analyzing data values contained in the first data and for coding the data values as the coded data; and coded-data generating means for generating the coded data by coding the first data based on the coding table generated by said coding-table generating means.

9. A data processing apparatus according to claim 1, wherein said embed-coding means embeds the decoding information into the third data so that the embedded data is decoded into the third data and the decoding information based on correlation of the third data.

10. A data processing apparatus according to claim 1, wherein said embed-coding means generates coded data by coding the third data, and generates the embedded data by modifying part of the coded data based on the decoding information, thereby embedding the decoding information into the third data.

11. A data processing apparatus according to claim 10, wherein said coding means comprises:
coding-table generating means for generating a coding table for statistically analyzing data values contained in the third data and for coding the data values as the coded data; and
coded-data generating means for generating the coded data by coding the third data based on the coding table generated by said coding-table generating means.

12. A data processing apparatus according to claim 1, wherein said decoding-information generating means generates the decoding information including presentation information indicating a method for presenting the first data and the second data reproduced from the third data based on the decoding information.

13. A data processing method for coding data, comprising the steps of:
generating third data by coding first data and second data and generating decoding information, the third data being decoded into the first data and the second data based on the decoding information; and
embedding the generated decoding information into the third data, thereby generating embedded data.

14. A computer-controlling data processing program for coding data, comprising the steps of:
generating third data by coding first data and second data and generating decoding information, the third data being decoded into the first data and the second data based on the decoding information; and
embedding the generated decoding information into the third data, thereby generating embedded data.

15. A storage medium in which a computer-controlling data processing program for coding data is stored, said data processing program comprising the steps of:
generating third data by coding first data and second data and generating decoding information, the third data being decoded into the first data and the second data based on the decoding information; and
embedding the generated decoding information into the third data, thereby generating embedded data.

16. Embedded data generated by a data processing method, said data processing method comprising the steps of:
generating third data by coding first data and second data and generating decoding information, the third data being decoded into the first data and the second data based on the decoding information; and
embedding the generated decoding information into the third data, thereby generating embedded data.

17. A storage medium in which embedded data generated by a data processing method is stored, said data processing method comprising the steps of:
generating third data by coding first data and second data and generating decoding information, the third data being decoded into the first data and the second data based on the decoding information; and
embedding the generated decoding information into the third data, thereby generating embedded data.

18. A data processing apparatus for processing embedded data which is obtained by generating third data by coding first data and second data and by embedding decoding information, which is used for decoding the third data into the first data and the second data, into the third data, said data processing apparatus comprising:
first decoding means for decoding the embedded data into the third data and the decoding information; and
second decoding means for decoding the third data into the first data and the second data according to the decoding information.

19. A data processing apparatus according to claim 18, wherein said first decoding means decodes the embedded data into the third data and the decoding information based on correlation of the embedded data.

20. A data processing apparatus according to claim 18, wherein said first decoding means comprises:
provisional decoding means for provisionally decoding the embedded data based on a coding table and for outputting provisionally decoded data;
provisional-coding-table generating means for generating a provisional coding table based on the provisionally decoded data; and
third-data/decoding-information decoding means for decoding the embedded data into the third data based on the coding table and the provisional coding table, and decoding the embedded data into the decoding information by comparing the coding table with the provisional coding table.

21. A data processing apparatus according to claim 18, wherein the third data is generated by embedding the second data into the first data, and said second decoding means decodes the third data into the first data and the second data according to an embedding format indicated by the decoding information reproduced by said first decoding means.

22. A data processing apparatus according to claim 21, wherein said second decoding means decodes the third data into the first data and the second data based on correlation of the third data.

23. A data processing apparatus according to claim 21, wherein said second decoding means comprises:

provisional decoding means for provisionally decoding the third data based on a coding data and for outputting provisionally decoded data;

provisional-coding-table generating means for generating a provisional coding table based on the provisionally decoded data; and first-data/second-data decoding means for decoding the third data into the first data based on the coding table and the provisional coding table, and decoding the third data into the second data by comparing the coding table with the provisional coding table.

24. A data processing apparatus according to claim 21, wherein said second decoding means decodes the third data into the first data and the second data based on the decoding information according to decoding methods which are different among predetermined units.

25. A data processing apparatus according to claim 18, wherein said second decoding means decodes the third data into the first data and the second data according to the decoding information, which serves as a decoding program executed on a computer.

26. A data processing apparatus according to claim 18, wherein said first decoding means decodes the embedded data into the decoding information including presentation information indicating a method for presenting the first data and the second data to be reproduced by said second decoding means.

27. A data processing method for processing embedded data which is obtained by generating third data by coding first data and second data and by embedding decoding information, which is used for decoding the third data into the first data and the second data, into the third data, said data processing method comprising the steps of:

decoding the embedded data into the third data and the decoding information; and decoding the third data into the first data and the second data according to the decoding information.

28. A computer-controlling data processing program for processing embedded data which is obtained by generating third data by coding first data and second data and by embedding decoding information, which is used for decoding the third data into the first data and the second data, into the third data, said data processing program comprising the steps of:

decoding the embedded data into the third data and the decoding information; and decoding the third data into the first data and the second data according to the decoding information.

29. A storage medium in which a computer-controlling data processing program is stored, said computer-controlling data processing program being used for processing embedded data which is obtained by generating third data by coding first data and second data and by embedding decoding information, which is used for decoding the third data into the first data and the second data, into the third data, said data processing program comprising the steps of:

decoding the embedded data into the third data and the decoding information; and decoding the third data into the first data and the second data according to the decoding information.

* * * * *